US012562030B2

(12) United States Patent
Loomes et al.

(10) Patent No.: US 12,562,030 B2
(45) Date of Patent: Feb. 24, 2026

(54) RANDOM TRIGGER FOR COMPUTER-IMPLEMENTED GAME

(71) Applicant: Games Global Operations Limited, Douglas (IM)

(72) Inventors: Michael Loomes, Ipswich (GB); Chaoyu Chu, Ipswich (GB)

(73) Assignee: GAMES GLOBAL OPERATIONS LIMITED, Douglas (IM)

( * ) Notice: Subject to any disclaimer, the term of this patent is extended or adjusted under 35 U.S.C. 154(b) by 275 days.

(21) Appl. No.: 18/238,659

(22) Filed: Aug. 28, 2023

(65) Prior Publication Data

US 2025/0078620 A1 Mar. 6, 2025

(51) Int. Cl.
*G07F 17/00* (2006.01)
*G07F 17/32* (2006.01)

(52) U.S. Cl.
CPC ...... *G07F 17/3267* (2013.01); *G07F 17/3213* (2013.01)

(58) Field of Classification Search
None
See application file for complete search history.

(56) References Cited

U.S. PATENT DOCUMENTS 5,788,573 A * 8/1998 Baerlocher ......... G07F 17/3258 463/16
6,467,770 B1 * 10/2002 Matosevic ................ A63F 5/00 273/274
6,988,731 B2 * 1/2006 Inoue .................. G07F 17/3213 463/31
7,306,520 B2 * 12/2007 Kaminkow ............. G07F 17/34 463/20
8,221,214 B2 * 7/2012 Nicely ................ G07F 17/3244 463/16
8,474,820 B2 * 7/2013 Walker .................... G07F 17/32 273/142 E
9,005,004 B2 * 4/2015 Nicely .................. G07F 17/322 463/17
9,582,958 B2 * 2/2017 Pagano ................. G07F 17/326

(Continued)

OTHER PUBLICATIONS

Grant, Daniel; "Roulette Neighbours: The Expert 5-Number Bet"; downloaded from the world wide web at https://www.playojo.com/blog/roulette/roulette-neighbours; Apr. 14, 2021.

(Continued)

*Primary Examiner* — Paul A D'Agostino

(57) ABSTRACT

Systems, methods, and memory devices for a computer-implemented game are disclosed. A graphical user interface is output to a display screen. The graphical user interface includes a plurality of user-selectable numbers corresponding to a plurality of numbers in the computer-implemented game. After receiving an indication that a particular user-selectable number has been selected, a primary winning number is selected and a determination of whether to activate a trigger is made. An animation is output to the display screen as part of the graphical user interface. After the animation stops, the display screen depicts an indication of the primary winning number, an indication of whether the trigger is activated, and an amount of an award. If the trigger is activated, the display screen depicts one or more additional winning numbers.

20 Claims, 21 Drawing Sheets

(56) References Cited

U.S. PATENT DOCUMENTS 9,600,974 B2 * 3/2017 Yee .................... G07F 17/3244
10,115,273 B2 * 10/2018 Uss .................... G07F 17/34
10,210,713 B2 * 2/2019 Lutnick .................... G07F 17/32
10,403,092 B2 * 9/2019 Heenan .................... G07F 17/3213
10,475,277 B2 * 11/2019 Reeves .................... G07F 17/326
10,629,024 B1 * 4/2020 Haushalter .................... G07F 17/3225
10,726,678 B1 * 7/2020 Rehill .................... G07F 17/326
10,769,893 B1 9/2020 Chinn
11,222,510 B2 * 1/2022 Baskerville .................... G07F 17/3288
11,282,329 B2 3/2022 Fisher et al.
11,315,382 B2 * 4/2022 Danielson .................... G07F 17/329
11,443,585 B2 9/2022 Kek et al.
11,452,934 B2 9/2022 Bergant
11,551,530 B2 * 1/2023 Brikho .................... A63F 5/0088
11,847,893 B2 * 12/2023 Watkins .................... G07F 17/3211
11,941,948 B2 * 3/2024 Pawlak .................... G07F 17/3267
12,333,907 B2 * 6/2025 Peterson .................... G07F 17/3216
2004/0251624 A1 * 12/2004 Hodapp .................... A63F 5/04 273/139
2005/0255904 A1 * 11/2005 Duhamel .................... G07F 17/3267 463/17
2006/0025201 A1 * 2/2006 Van Asdale .................... G07F 17/32 463/20
2006/0046833 A1 * 3/2006 Hatakeyama .................... G07F 17/32 463/20
2007/0060262 A1 * 3/2007 Kosaka .................... A63F 5/00 463/16
2007/0135204 A1 * 6/2007 Nicely .................... G07F 17/322 463/17
2008/0113758 A1 * 5/2008 Johnson .................... G07F 17/32 463/20
2009/0108526 A1 * 4/2009 Moody .................... G07F 17/32 273/274
2010/0102507 A1 * 4/2010 Bontempo .................... G07F 17/32 273/309
2010/0144419 A1 * 6/2010 Miltenberger .................... A63F 5/007 273/142 E
2010/0227665 A1 * 9/2010 Nicely .................... G07F 17/3288 273/142 E
2010/0279757 A1 * 11/2010 Glenn .................... G07F 17/3211 463/30
2011/0165932 A1 * 7/2011 Rommerdahl .................... G07F 17/3209 463/17
2012/0061912 A1 * 3/2012 Sorge .................... A63F 5/00 273/142 E
2012/0238343 A1 * 9/2012 Perrone .................... G07F 17/3262 273/274
2013/0005426 A1 * 1/2013 Nicely .................... G07F 17/3267 463/20
2013/0059638 A1 * 3/2013 Nicely .................... G07F 17/34 463/17
2013/0059647 A1 * 3/2013 Nicely .................... G07F 17/326 463/25
2014/0094280 A1 * 4/2014 Berman .................... G07F 17/3213 463/25
2014/0106841 A1 * 4/2014 Lutnick .................... G07F 17/3286 463/17
2014/0113698 A1 * 4/2014 Rakestraw .................... G07F 17/3239 463/20
2016/0063799 A1 * 3/2016 Reeves .................... G07F 17/326 463/17
2016/0093138 A1 * 3/2016 Munakata .................... G07F 17/3272 463/16
2016/0189470 A1 * 6/2016 Barragan .................... G07F 17/322 463/20
2016/0328905 A1 * 11/2016 Kohl .................... G07F 17/3262
2017/0301179 A1 * 10/2017 Palenzuela .................... G07F 17/3223
2019/0019377 A1 * 1/2019 Aoki .................... G07F 17/34
2019/0318570 A1 * 10/2019 Marks .................... G07F 17/3211
2020/0098227 A1 * 3/2020 Hendricks .................... G07F 17/34
2020/0211332 A1 * 7/2020 Brikho .................... G07F 17/3244
2021/0106904 A1 * 4/2021 Bergant .................... A63F 5/00
2021/0110643 A1 * 4/2021 Kek .................... G07F 17/3211
2021/0125453 A1 * 4/2021 Olive .................... G07F 17/34
2021/0134122 A1 * 5/2021 Smith .................... G07F 17/3272
2021/0264721 A1 * 8/2021 Danielson .................... G07F 17/3213
2021/0312761 A1 * 10/2021 Abrahamson .................... G07F 17/3293
2021/0375097 A1 * 12/2021 Coppola .................... G07F 17/3213
2022/0032169 A1 * 2/2022 Jones .................... G07F 17/3213
2022/0076531 A1 * 3/2022 Cuddy .................... G07F 17/34
2022/0168626 A1 * 6/2022 Kim .................... A63F 13/69
2022/0277623 A1 * 9/2022 Daley .................... G07F 17/3204
2023/0096360 A1 * 3/2023 Atkinson .................... G07F 17/323 463/17
2023/0114268 A1 * 4/2023 Jones .................... G07F 17/3209 463/31
2024/0119804 A1 * 4/2024 Jones .................... G07F 17/3288
2024/0304055 A1 * 9/2024 Jones .................... G07F 17/3258
2024/0346885 A1 * 10/2024 Fulton .................... G07F 17/3267
2025/0061783 A1 * 2/2025 Connelly .................... G07F 17/3269
2025/0140069 A1 * 5/2025 Marsh .................... G07F 17/3267

OTHER PUBLICATIONS

Crane, Lewis; "Lightning Roulette Strategy Guide", MrQ, downloaded from the world wide web at https://mrq.com/blog/lightning-roulette-strategy-guide#:~:text=The%20best%20strategy%20for%20Lightning,number%20containing%20a%20Lightning%20Multiplier; Sep. 16, 2022.
"Live Lightning Roulette: Best Strategy with Tips and Demo—Win Up to 500x!"; downloaded from the world wide web at https://www.livecasinocomparer.com/live-casino-games/live-roulette/roulette-strategy/lightning-roulette-strategy/ on Aug. 22, 2023.
Socialskillsgames; Multiball Roulette play for free; screen shots of video on world wide web at https://www.youtube.com/watch?v=zHrIQwbw9Tg; Feb. 19, 2013.

* cited by examiner

RANDOM TRIGGER FOR COMPUTER-IMPLEMENTED GAME

FIELD

This disclosure relates to a computer-implemented game.

BACKGROUND

During a typical game of roulette, there is a single winning number for each iteration. In order for a user to increase his or her odds of winning, the user has to select multiple numbers. As a non-limiting example, for each iteration of a game of roulette, the user can select one (1) of thirty-six (36) numbers as a potential winning number. As a result, the user has a 1-and-36 chance of selecting the winning number if the user only selects a single number. If the user wants increased odds of selecting a winning number during the iteration, the user has to select an additional number. For example, if the user selects five (5) different numbers as potential winning numbers, the user has a 5-and-36 chance of selecting the winning number. However, in order to select five different numbers, the user will have to increase his or her wager, or wager less on each selected number. As a result, the user experience may be less enjoyable.

OVERVIEW

The present application discloses embodiments including and/or related to systems, methods, and apparatus that provide improvements in a computer-implemented game by including a random trigger feature that increases the odds of having a winning result.

In a first aspect, a method is provided. The method comprises outputting, by a processor, a graphical user interface to a display screen. The graphical user interface comprises a plurality of user-selectable numbers corresponding to a plurality of numbers in a computer-implemented game. The method further comprises, after receiving an indication that a particular user-selectable number on the graphical user interface has been selected, randomly selecting, by the processor, a single number from the plurality of numbers for the computer-implemented game and randomly determining whether to activate a trigger for the computer-implemented game. The method also includes outputting, by the processor, an animation to the display screen as part of the graphical user interface. After the animation stops, the display screen depicts an indication of the single number, an indication of whether the trigger is activated, and an amount of an award based on whether the particular user-selectable number is a winning number. The winning number is any number in a group of numbers if the trigger is activated or is the single number if the trigger is not activated. The group of numbers includes the single number and one or more additional numbers from the plurality of numbers.

In a second aspect, a computing system is provided. The computing system includes a processor and a non-transitory computer-readable memory comprising executable instructions. Execution of the executable instructions by the processor cause the processor to perform operations. The operations comprise outputting a graphical user interface to a display screen. The graphical user interface comprises a plurality of user-selectable numbers corresponding to a plurality of numbers in a computer-implemented game. The operations further comprise, after receiving an indication that a particular user-selectable number on the graphical user interface has been selected, randomly selecting, by the processor, a single number from the plurality of numbers for the computer-implemented game and randomly determining whether to activate a trigger for the computer-implemented game. The operations also include outputting, by the processor, an animation to the display screen as part of the graphical user interface. After the animation stops, the display screen depicts an indication of the single number, an indication of whether the trigger is activated, and an amount of an award based on whether the particular user-selectable number is a winning number. The winning number is any number in a group of numbers if the trigger is activated or is the single number if the trigger is not activated. The group of numbers includes the single number and one or more additional numbers from the plurality of numbers.

In a third aspect, a non-transitory computer-readable medium is provided. The non-transitory computer-readable medium comprises instructions that, when executed by a processor, cause the processor to perform functions. The functions comprise outputting a graphical user interface to a display screen. The graphical user interface comprises a plurality of user-selectable numbers corresponding to a plurality of numbers in a computer-implemented game. The functions further comprise, after receiving an indication that a particular user-selectable number on the graphical user interface has been selected, randomly selecting, by the processor, a single number from the plurality of numbers for the computer-implemented game and randomly determining whether to activate a trigger for the computer-implemented game. The functions also include outputting, by the processor, an animation to the display screen as part of the graphical user interface. After the animation stops, the display screen depicts an indication of the single number, an indication of whether the trigger is activated, and an amount of an award based on whether the particular user-selectable number is a winning number. The winning number is any number in a group of numbers if the trigger is activated or is the single number if the trigger is not activated. The group of numbers includes the single number and one or more additional numbers from the plurality of numbers.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided herein are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

Figure 1:
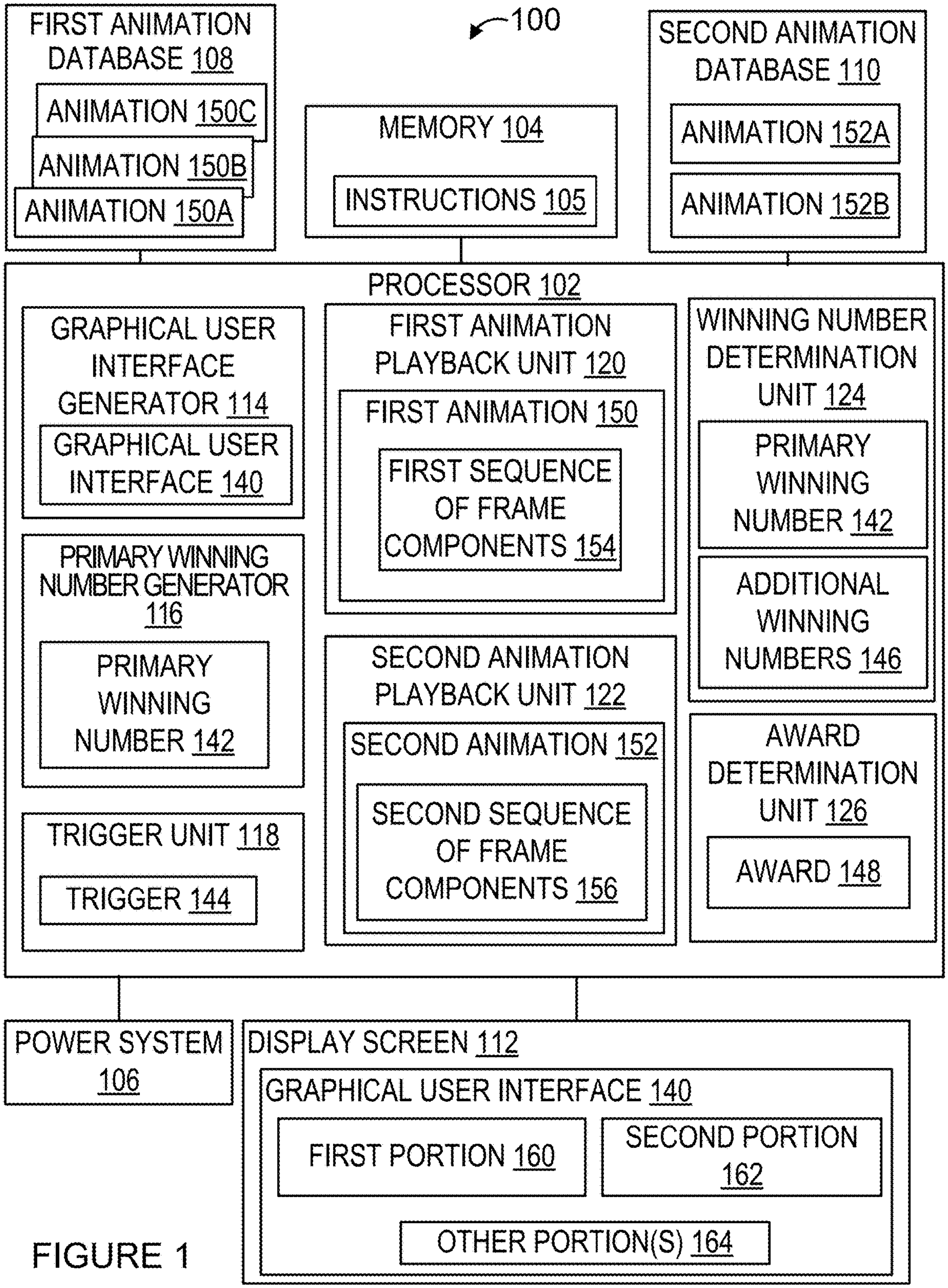
FIG. 1 is a block diagram of a machine in accordance with the example embodiments.

All the figures are schematic, not necessarily to scale, and generally only show parts which are necessary to explain example embodiments, wherein other parts can be omitted or merely suggested.

DETAILED DESCRIPTION

I. Introduction

In this detailed description, several example embodiments are disclosed including, but not limited to, embodiments pertaining to performing aspects of a computer-implemented game (e.g., a digital, electronic game) with a randomly activated trigger feature (i.e., a trigger). When the trigger feature is activated, the likelihood of a user having a positive outcome (i.e., a winning outcome) increases.

To illustrate, according to the techniques described herein, the computer-implemented game provides a roulette wheel and a trigger mechanism that is selectively activated to modify a win result. For example, if the trigger mechanism is activated for a particular occurrence of the computer-implemented game (e.g., a spin of the roulette wheel and release of a roulette ball on the spinning roulette wheel), any number within a group of numbers can be a winning number. As a non-limiting example, in the computer-implemented game, if a roulette ball lands on a particular number (e.g., the number "34") and the trigger mechanism is activated, the particular number (e.g., "34") is identified as a winning numbers and numbers adjacent to the particular number on the roulette wheel can also be identified as winning numbers. Thus, if the trigger mechanism is activated, positions adjacent to the "winning result" on the roulette wheel (e.g., the position associated with the number "34") also turn into winning positions. As a result, a segment of the roulette wheel, as opposed to a single position, can result correspond to winning numbers. In some implementations, up to three (3) positions on either side of the position on which the roulette ball lands can be turned into winning positions. To illustrate, if the roulette balls lands on the position associated with the particular number (e.g., "34"), up to three (3) positions to the left of the particular number and up to three (3) to the right of the particular number can correspond to winning positions, which results in a total of seven (7) winning positions. Additionally, as described below, multipliers can be applied to either the position on which the roulette ball lands or one or more of the adjacent positions that have been turned into winning positions, by virtue of activation of the trigger mechanism, to provide a player with a larger return.

However, if the roulette ball lands on the particular number (e.g., "34") and the trigger mechanism is not activated, only the particular number (e.g., "34") is identified as a winning number. Thus, when the trigger mechanism is activated, the amount of winning numbers increase, which can increase player enjoyment. In at least some embodiments, each position on the roulette wheel corresponds to a virtual pocket into which the roulette ball can land to indicate a winning number.

In one implementation of the computer-implemented game, a player is presented with a roulette board. For example, a graphical user interface (GUI) can be output to a display screen to present the roulette board to the player, and the player can use the GUI to place wagers on different numbers (e.g., user-selectable numbers) on the roulette board. Once the player finishes placing wagers on the roulette board, the player can use the GUI to initiate the computer-implemented game. As a non-limiting example, the GUI can include a user-selectable button (e.g., a "spin" button) that, when pressed by the player, initiates the computer-implemented game. To illustrate, after the player finished placing wagers on the roulette board and presses the spin button, a spin of the roulette wheel may be initiated to start the computer-implemented game. For purposes of this description, user-selectable button can be referred to as a player-selectable button and/or a user-selectable control, and vice versa. A graphical user interface can be referred to as a player user interface, and vice versa. A player can be referred to as a user, and vice versa.

A single number from a plurality of numbers in the computer-implemented game can be selected in response to the player pressing the spin button. As a non-limiting example, a processor associated with the computer-implemented game can randomly select the single number. To illustrate, the roulette wheel can include integer numbers from "1" to "36". Each number on the roulette wheel corresponds to one of the user-selectable numbers on the roulette board on which the player can place a wager. The processor can randomly select one of the numbers (e.g., from "1" to "36"), and the roulette wheel can spin in such a manner that an indicator lands on the randomly selected number (e.g., a "primary winning number"). To illustrate, if the processor randomly selects the number "34", the roulette wheel can spin in such a manner that an indicator lands on the number "34". In this instance, the number "34" is classified as the primary winning number and the player receives a monetary award if the player placed a wager on the number "34" on the roulette board. Unless the trigger mechanism is activated, as described below, the player will only receive a monetary award if the player placed a wager on the primary winning number. In at least some embodiments, the indicator of the randomly selected number includes the roulette ball within a roulette wheel pocket. In at least some other embodiments, the indicator of the randomly selected number includes a pointer (e.g., an arrow icon) that remains fixed on the graphical user interface while the roulette wheel spins.

However, if the trigger mechanism is activated, additional winning numbers can be identified and the player can receive a monetary award if the player placed a wager on the primary winning number and/or one of the additional winning numbers. To illustrate, the processor can randomly determine whether to activate the trigger mechanism in response to the player pressing the spin button.

When displaying the computer-implemented game on the display screen, in some implementations, the roulette when and the trigger mechanism can be concentrically provided in a wheel arrangement, with an inner disc representing the trigger mechanism and with the roulette numbers (e.g., "1" to "36") being provided in a band on an outer periphery of the wheel arrangement. A fixed band ban can separate the roulette numbers and the inner disc, and an arrow head can be presented to indicate the primary winning number. To illustrate, the arrow head can be located on the fixed band and can point towards the roulette numbers. When the roulette wheel stops, the number that the arrow head points to is the primary winning number.

In some implementations, the inner disc includes four segments. Two segments can be a first color (e.g., gold), and the other two segments can be a second color (e.g., grey). If the inner disc lands such that the back of the arrow head points toward a grey segment, the trigger mechanism is not activated and the primary winning number is only winning number. However, if the inner disc lands such that the back of the arrow head points towards a golden segment, the trigger mechanism is activated to identify additional winning numbers. The trigger mechanism can be activated fifty (50) percent of the time; however, other configurations are possible.

In some implementations, the computer-implemented game can have a standard payout of 20-to-1 if the player places a wager on the primary winning number. Thus, for each $1 wager the player places on the primary winning number, the player receives a $20. This standard payout can represent a reduction in a 36-to-1 payout for a typical roulette game, as the difference funds the additional winning numbers when the trigger mechanism is activated. However, other configurations (e.g., different types of multipliers, different probabilities of activating the trigger, etc.) can change the payout. In at least some other implementations, the computer-implemented game can be played without any wager and/or payout.

In a live environment implementation (or pseudo-live environment), an additional wheel may be provided next to a normal roulette wheel, which may offer similar functionality to the disc of the above example. The wheel may be physical or digital. This wheel may have fifty percent (50%) odds of activating the trigger feature as above, or may have alternative odds as per the particular game configuration.

In a streaming or pseudo-live streaming environment, the additional wheel may be shown at the same time as the roulette wheel, or the display shown to the user may alternate between separate views of the roulette wheel and the trigger wheel.

In some embodiments, a die or dice may be used to trigger the trigger feature. For example, number one (1) to three (3) activate one (1) to three (3) additional winning numbers, while all other numbers do not lead to a win. A custom die or custom dice may also be provided for this purpose.

A coin flip may also be used to trigger the trigger feature, with the number of additional winning numbers being selected in any other way. For example, the additional numbers are shown digitally, but a coin flip activates the feature, or not.

According to one implementation, an appropriate indicator, such as a light, may be used to show that the feature is activated. Additionally, according to one implementation, a specific display area may be provided to show the additional winning numbers to a user. This may possibly appear on a screen in the background of a live studio (for live dealer versions).

II. Example Architecture

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, animations are illustrated and associated with reference number 150. When referring to a particular one of the animations, such as the animation 150A, the distinguishing letter "A" is used. However, when referring to any arbitrary one of the animations or to the animations as a group, the reference number 150 may be used without a distinguishing letter.

FIG. 1 is a block diagram of a machine 100 in accordance with the example embodiments. The machine 100 includes a processor 102, a memory 104 coupled to the processor 102, a power system 106 coupled to the processor 102, a first animation database 108 accessible by the processor 102, a second animation database 110 accessible by the processor 102, and a display screen 112 coupled to the processor 102. The memory 104 can correspond to a non-transitory computer-readable medium that includes instructions 105 executable by the processor 102 to perform the operations described herein. The processor 102 can be configured to perform a method or at least some functions of a method according to the example embodiments. In at least some embodiments, the machine 100 is configured as a computing system. In at least some embodiments, the machine 100 includes a component that moves during performance of a game, such as a roulette wheel or a cooling fan.

The power system 106 includes means for powering some portion(s) of the machine 100, such as the processor 102, the memory 104, and/or the display screen 112. Thus, although the power system 106 is coupled to provide power to the processor 102 (e.g., a computing system), in other implementations, the power system 106 can provide power to other components of the machine 100, such as the display screen 112, the memory 104, etc. The power system 106 can include a power supply, such as a battery, a generator, a fuel cell, or a solar cell, or some other type of power supply instead or in addition. The power system 106 can include a power circuit for distributing electrical power throughout the machine 100 where needed. The power system 106 can include a connector and/or connection for connecting to another power system, such as a power system within a building and/or a power system of an electrical utility company.

The processor 102 includes a graphical user interface generator 114, a primary winning number generator 116, a trigger unit 118, a first animation playback unit 120, a second animation playback unit 122, a winning number determination unit 124, and an award determination unit 126. In some implementations, one or more components of the processor 102 can be implemented using dedicated circuitry. As a non-limiting example, one or more components of the processor 102 can be implemented using an application-specific integrated circuit (ASIC) or a field-programmable gate array (FPGA) device. In some implementations, one or more components of the processor 102 can be implemented using computer software. As a non-limiting example, operations associated with one or more components of the processor 102 can be performed by executing the instructions 105 stored in the memory 104.

The graphical user interface generator 114 can be configured to generate a graphical user interface 140 for a computer-implemented game. The graphical user interface generator 114 can also be configured to output the graphical user interface 140 to the display screen 112. Throughout the course of the computer-implemented game, the graphical user interface 140 can change, depending on the stage of the game. Thus, in conjunction with the description of FIG. 1, graphical user interfaces 140 at different stages of the computer-implemented game are described.

Figure 2:
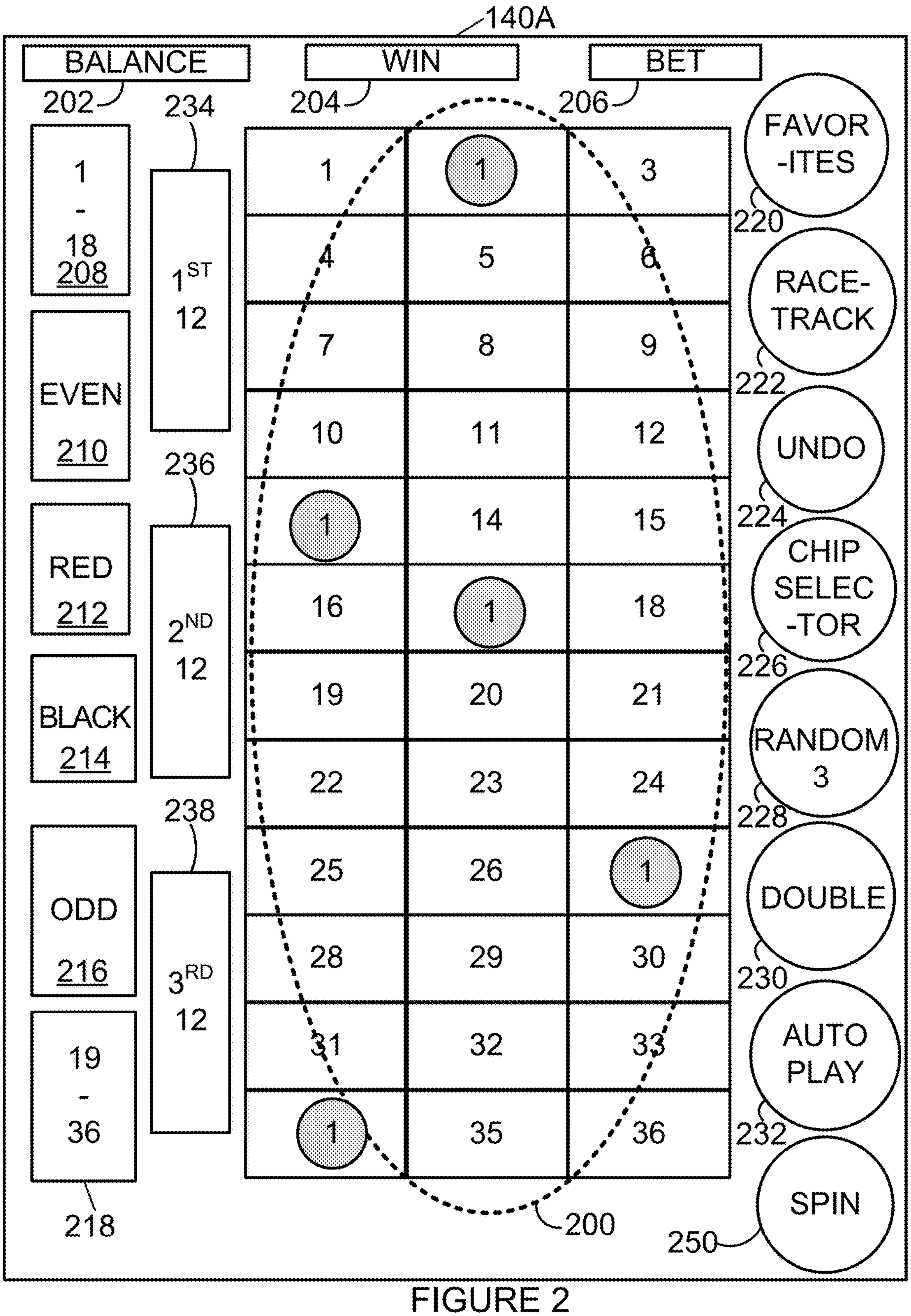
FIG. 2 is an example of a graphical user interface in accordance with the example embodiments.

Referring to FIG. 2, an example of a graphical user interface 140A for the computer-implemented game is illustrated. The graphical user interface 140A depicted in FIG. 2 can be presented to a player via the display screen 112 at the beginning of the computer-implemented game. In particular, the graphical user interface 140A enables the player to select at least one user-selectable number 200 on which to wager.

To illustrate, the graphical user interface 140A includes a plurality of user-selectable numbers 200 corresponding to a plurality of numbers in the computer-implemented game (e.g., a computer-implemented roulette game). In FIG. 2, the user-selectable numbers 200 span from "1" to "36". However, it should be understood that the user-selectable numbers 200 in depicted in FIG. 2 are merely for illustrative purposes and should not be construed as limiting. In other implementations, the user-selectable numbers 200 can span from "1" to "38", from "0" to "35", from "1" to "36" plus "0", from "1" to "36" plus "0" and "00", or from any other range. As described below, the player of the computer-implemented game can use the graphical user interface 140A to select one or more of the user-selectable numbers 200 on which to wager. For a standard roulette game including thirty-six or thirty-seven numbers on the roulette wheel, a standard roulette game payout rate for a single number on the roulette wheel can be 35:1.

The graphical user interface 140A can include other prompts, options, and information. To illustrate, the graphical user interface 140A can include a balance 202 prompt that indicates an amount of money that the player has to wager on the user-selectable numbers 200. The graphical user interface 140A can also include a win 204 prompt that indicates an amount of money that the player has won while playing the computer-implemented game. The graphical user interface 140A can also include a bet 206 prompt that indicates how much they player is wagering (e.g., betting) during a current instance of the computer-implemented game.

The graphical user interface 140A can be a touch-screen interface, such that the player can select one or more of the user-selectable numbers 200 by touching a corresponding section of the display screen 112. For example, if the player chooses to wager on the number "17", the player can touch the portion of the display screen 112 where the graphical user interface 140A represents the number "17". In FIG. 2, the graphical user interface 140A represents the number "2" in the top row, center column of the user-selectable numbers 200, the number "13" in the fifth row, left-most column of the user-selectable numbers 200, the number "17" in the sixth row, center column of the user-selectable numbers 200, the number "27" in the ninth row, right-most column of the user-selectable numbers 200, and the number "34" in the bottom row, left-most column of the user-selectable numbers 200. The aforementioned numbers represented by the graphical user interface 140A are shown as being covered by, for example, a coin, chip, or token.

However, in some scenarios, the player may desire to select a plurality of the user-selectable numbers 200 on which to wager. To facilitate rapid selection of a plurality of user-selectable numbers 200, the graphical user interface 140A can include additional prompts and/or options. To illustrate, the graphical user interface 140A can include a selectable option 208 that, when selected by the player, automatically selects numbers "1" through "18" as user-selectable numbers 200 on which the player desires to wager. The graphical user interface 140A can also include a selectable option 210 that, when selected by the player, automatically selects the even numbers as the user-selectable numbers 200 on which the player desires to wager. The graphical user interface 140A can also include a selectable option 216 that, when selected by the player, automatically selects the odd numbers as the user-selectable numbers 200 on which the player desires to wager. The graphical user interface 140A can also include a selectable option 218 that, when selected by the player, automatically selects the numbers "19" through "36" as the user-selectable numbers 200 on which the player desires to wager.

The graphical user interface 140A can also include a selectable option 234 that, when selected by the player, automatically selects the first twelve user-selectable numbers 200 (e.g., numbers "1" through "12") as the user-selectable numbers 200 on which the player desires to wager. The graphical user interface 140A can also include a selectable option 236 that, when selected by the player, automatically selects the second twelve user-selectable numbers 200 (e.g., numbers "13" through "24") as the user-selectable numbers 200 on which the player desires to wager. The graphical user interface 140A can also include a selectable option 238 that, when selected by the player, automatically selects the third twelve user-selectable numbers 200 (e.g., numbers “25” through “36”) as the user-selectable numbers 200 on which the player desires to wager.

The graphical user interface 140A can also include additional selectable options to facilitate rapid selection of a plurality of user-selectable numbers 200. To illustrate, the graphical user interface 140A can include a selectable option 220 that, when selected by the player, automatically selects the player’s favorite user-selectable numbers 200. For example, a history indicating how many times each user-selectable number 200 was selected can be stored during a session of the computer-implemented game. Upon selecting the selectable option 220, the user-selectable numbers 200 that are were most frequently selected during the session of the computer-implemented game can be automatically selected as the user-selectable numbers 200 on which the player desires to wager.

The graphical user interface 140A can also include a selectable option 228 that, when selected by the player, automatically selects a three random user-selectable numbers 200 for the player to wager. If thirty-three (33) user-selectable numbers 200 have been selected as prior to selecting the selectable option 228, selectable option 228 will select the remaining user-selectable numbers 200.

As illustrated in FIG. 2, the graphical user interface 140A also includes a selectable option 224 that, when selected by the player, undoes the last change to the bets placed on the user-selectable numbers 200. A chip selector 226 option displays the chip sizes (indicative of wager amounts) available in the computer-implemented game. The player can use arrows or can click on a chip to select the chip size (e.g., the wager amount) the player wants. A double 230 option, when selected by the player, doubles all bets (e.g., wager amounts) currently placed. An autoplay 232 option, when selected by the player, results in the computer-implemented game starting (e.g., the roulette wheel) spinning a set number of times in succession without the player interacting with the computer-implemented game.

As illustrated in FIG. 2, the graphical user interface 140A also includes a selectable option 212 that, when selected by the player, indicates that the player desires to place a wager that a red-colored number or a number corresponding to a red-colored roulette wheel position or pocket will be a primary winning number 142 in the computer-implemented game. The graphical user interface 140A also includes a selectable option 214 that, when selected by the player, indicates that the player desires to place a wager that a black-colored number or a number corresponding to a black-colored roulette wheel position or will be the primary winning number 142 in the computer-implemented game.

For the purposes of the description below and as illustrated in FIG. 2, unless otherwise indicated, let’s assume that the player used the chip selector 226 option to place a one (1) dollar wager on the numbers “2”, “13”, “17”, “27”, and “34”. After the player selects the user-selectable numbers 200 (e.g., “2”, “13”, “17”, “27”, and “34”) and the wager amounts for each user-selectable number 200, the player can select the spin 250 option to start the computer-implemented game (e.g., spin the roulette wheel).

Additionally, as illustrated in FIG. 2, the graphical user interface 140A can also include a selectable option 222 that, when selected by the player, uses a racetrack to automatically place neighbor bets. In response to selecting the selectable option 222, a graphical user interface 140B is presented to the player.

Figure 3:
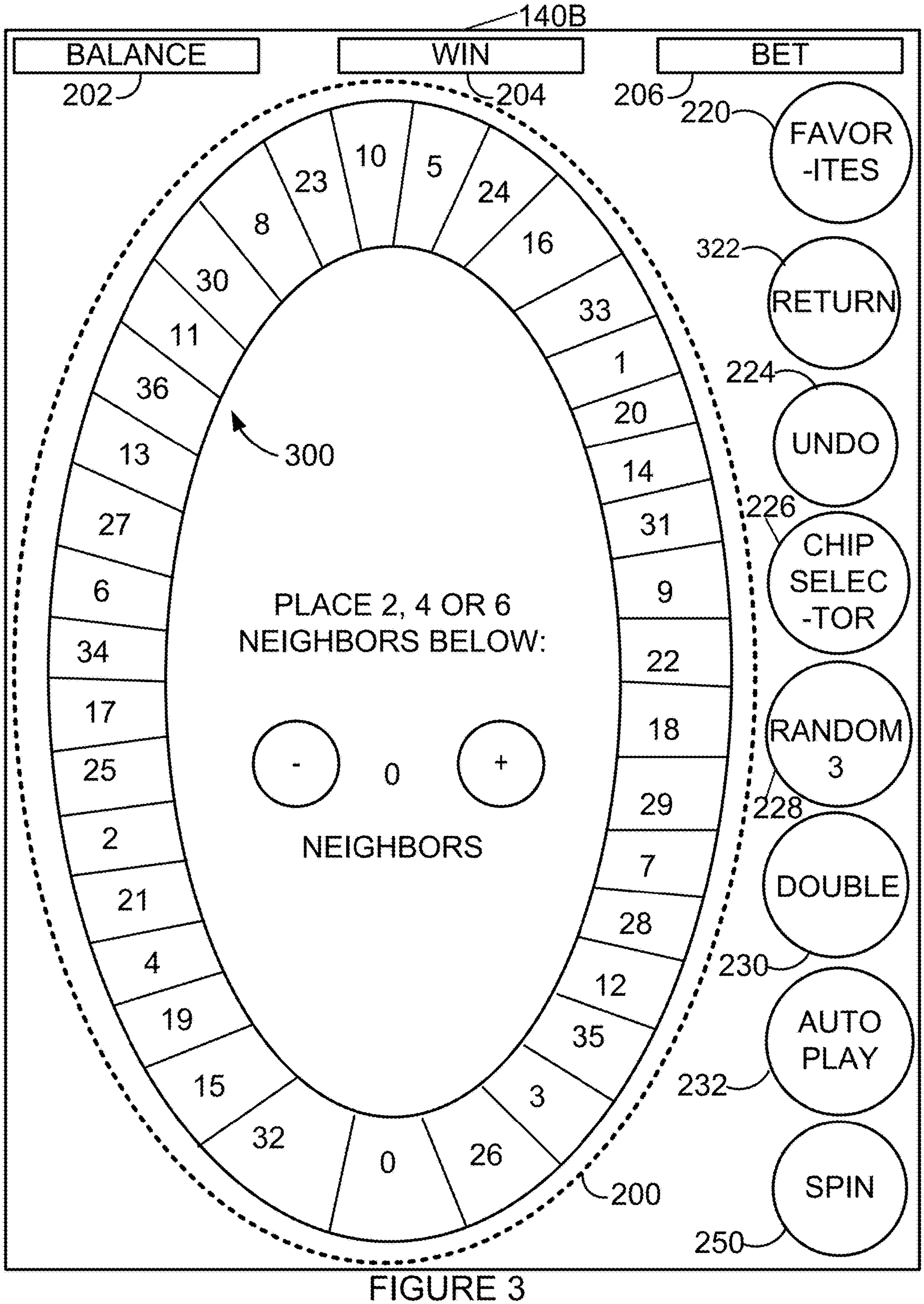
FIG. 3 is another example of a graphical user interface in accordance with the example embodiments.

Referring to FIG. 3, an example of a graphical user interface 140B for the computer-implemented game is illustrated. The graphical user interface 140B depicted in FIG. 3 can be presented to a player via the display screen 112 in response to the player selecting the selectable option 222 from the graphical user interface 140A. In particular, the graphical user interface 140B enables the player to select at least one user-selectable number 200 using a racetrack 300.

Using the graphical user interface 140B, the player may select how many neighbors the player wishes to wager on. For example, the player may select whether to wager on two (2) neighbors, four (4) neighbors, or six (6) neighbors. By selecting to wager on two (2) neighbors, the player selects to wager on one (1) user-selectable number 200 on each side of selected user-selectable number 200. To illustrate, if the player selects the number “0” as the user-selectable number 200 on which to wager and also selects to wager on two (2) neighbors, the number “32” and the number “26” are also selected as user-selectable numbers 200 on which to wager. By selecting to wager on four (4) neighbors, the player selects to wager on two (2) user-selectable numbers 200 on each side of the selected user-selectable number 200, and by selecting to wager on six (6) neighbors, the player selects to wager on three (3) user-selectable numbers 200 on each side of the selected user-selectable number 200. As described below, selecting neighbors aligns with an impact of a trigger mechanism that is randomly activated, in that the neighbors one, two, or three places to either side of the primary winning number 142 may be selected as additional winning numbers.

The graphical user interface 140B also includes a return 322 option that, when selected by the player, returns the player to the graphical user interface 140A.

Returning back to FIG. 1, the primary winning number generator 116 can be configured to randomly select a single number (e.g., the primary wining number 142) from a plurality of numbers for the computer-implemented game after receiving an indication that the particular user-selectable number 200 (e.g., “2”, “13”, “17”, “27”, and “34”) on the graphical user interface 140A have been selected. Each number in the plurality of numbers from which the primary winning number generator 116 selects the primary winning number 142 corresponds to a user-selectable number 200 in the plurality of user-selectable numbers. For example, in response to the player selecting the spin 250 option after selecting the user-selectable numbers 200 (e.g., “2”, “13”, “17”, “27”, and “34”), an indication can be provided to the primary winning number generator 116 to randomly select a number between “1” and “36” as the primary winning number 142 (e.g., the “single number”). Thus, the primary winning number generator 116 can operate as a random number generator that generates the primary winning number 142 from a selection of numbers between “1” and “36”. For the purposes of the description below, let’s assume that the primary winning number 142 generated by the primary winning number generator 116 is the number “34”.

Additionally, the trigger unit 118 can be configured to randomly determine whether to activate a trigger 144 after receiving an indication that a particular user-selectable number 200 on the graphical user interface 140A, 140B has been selected. For example, in response to the player selecting the spin 250 option after selecting the user-selectable numbers 200 (e.g., “2”, “13”, “17”, “27”, and “34”), the trigger unit 118 can randomly determine whether to activate the trigger 144. According to one implementation, the trigger 144 is activated fifty (50) percent of the time during a performance of multiple instances of the game. In other words, the probability of activating the trigger 144 during a single performance of the game is fifty (50) percent. According to other implementations, the trigger 144 is activated more than fifty (50) percent of the time or less than fifty (50) percent of the time during a performance of multiple instances of the game. In other words, the probability of activating the trigger during a single performance of the game can be greater than or less than fifty (50) percent.

If the trigger 144 is not activated, the winning number determination unit 124 can be configured to determine the primary winning number 142 is the sole winning number. However, if the trigger 144 is activated, the winning number determination unit 124 can be configured to determine that any number in a group of winning numbers is a winning number. The group of winning numbers can include the primary winning number 142 and additional winning numbers 146. The additional winning number 146 can include neighboring numbers to the primary winning number 142. Using FIG. 3 as an example, if the primary winning number 142 is the number "34" and the trigger 144 is activated, the additional winning numbers 146 can include the numbers "6" and "17" if two (2) additional winning numbers 146 are generated in response to activation of the trigger 144, the additional winning numbers 146 can include the numbers "27", "6", "17", and "25" if four (4) additional winning numbers 146 are generated in response to activation of the trigger 144, and the additional winning numbers 146 can include the numbers "13", "27", "6", "17", "25", and "2" if six (6) additional winning numbers 146 are generated in response to activation of the trigger 144.

The award determination unit 126 can be configured to determine an amount of an award 148 based on whether the player selected a winning number, as determined by the winning number determination unit 124. As described in greater detail with respect to FIGS. 12-13, the amount of the award 148 is a multiple of a wager if the player selected a winning number, as determined by the winning number determination unit 124. As a non-limiting example, if the player selects the number "34" as a user-selectable number 200 and the primary winning number 142 is the number "34", the award 148 may be equal to twenty times (20×) the wager the player placed on the number "34". Thus, in the above example, if the player wagered one (1) dollar on the number "34", the amount of the award 148 is equal to twenty (20) dollars. If the trigger 144 is activated, the player can receive additional awards 148 for each of the additional winning numbers 146 that the player selected.

In response to randomly determining the primary winning number 142 and randomly determining whether to activate the trigger 144, the processor 102 can output animations 150, 152 to the display screen 112 as part of the graphical user interface 140. When animations 150, 152 stop, the display screen 112 can depict an indication of the primary winning number 142, an indication of whether the trigger 144 is activated, and the amount of the award 148 based on the user-selectable numbers 200 selected by the player.

A first animation 150 can be selected from a group of animations 150A, 150B, 150C, etc. The first animation 150 can simulate the spinning of a roulette wheel (e.g., the first wheel segment 410 depicted in FIGS. 4-14) or can simulate a ball spinning around a roulette wheel. The first animation database 108 can store animations 150A, 150B, 150C for each possible number that can be generated by the primary winning number generator 116 (e.g., for each possible primary winning number 142). Thus, if there are thirty-six (36) possible numbers that can be generated by the primary winning number generator 116, the first animation database 108 can store thirty-six (36) animations 150. As a non-limiting example, the animation 150A can depict the roulette wheel segment 410 spinning around and stopping when a selection indicia 450 lands on the number "1", the animation 150B can depict the roulette wheel segment 410 spinning around and stopping when the selection indicia 450 lands on the number "2", the animation 150C can depict the roulette wheel segment 410 spinning around and stopping when the selection indicia 450 lands on the number "3", etc.

Once the first animation 150 is selected from the group of animations 150A, 150B, 150C, the first animation playback unit 120 can playout the first animation 150, and the graphical user interface generator 114 can output the first animation 150 to a first portion 160 of the display screen 112. For example, the first animation 150 can correspond to a first sequence of frame components 154 that is played out at the first portion 160 of the display screen 112 as part of the graphical user interface 140. As depicted in FIGS. 4-14, the first portion 160 of the display screen 112 can correspond to the portion of the graphical user interface 140 where the first wheel segment 410 is depicted spinning. Thus, each part of the first animation 150 represents a respective snapshot of the first portion 160 of the display screen 112.

A second animation 152 can be selected from a group of animations 152A, 152B. The second animation 152 can simulate the spinning of a trigger wheel (e.g., the second wheel segment 420 depicted in FIGS. 4-14). The second animation database 110 can store an animation 152A and an animation 152B. The animation 152A can depict the trigger wheel segment 420 spinning around and stopping when the selection indicia 450 lands on a trigger activation region 430, and the animation 152B can depict the trigger wheel segment 420 spinning around and stopping when the selection indicia 450 lands on a trigger deactivation region 440.

Once the second animation 152 is selected from the group of animations 152A, 152B, the second animation playback unit 122 can playout the second animation 152, and the graphical user interface generator 114 can output the second animation 152 to a second portion 162 of the display screen 112. For example, the second animation 152 can correspond to a second sequence of frame components 156 that is played out at the second portion 162 of the display screen 112 as part of the graphical user interface 140. As depicted in FIGS. 4-14, the second portion 162 of the display screen 112 can correspond to the portion of the graphical user interface 140 where the second wheel segment 420 is depicted spinning. Thus, each part of the second animation 152 represents a respective snapshot of the second portion 162 of the display screen 112.

The graphical user interface generator 114 can also be configured to output a fixed image 490 to another portion 164 of the display screen 112 as part of the graphical user interface 140 while the animations 150, 152 are played out at the first and second portions 160, 162 of the display screen 112, respectively. Thus, as depicted with respect to FIGS. 4-14, the fixed image 490 is output concurrently with the animations 150, 152.

It should be appreciated that processing by generating animations 150, 152 that using frame components 154, 156, as opposed to full frames, processing complexity can be reduced. For example, generating full frames to depict the animations 150, 152 may result in increased processing efficiency because a greater number of pixels have to be processed. However, by inserting the fixed image 490 at the portion 164 of the display screen 112 where there are no pixel changes and using frame components 154, 156 (e.g., a reduced number of pixels compared to the number of pixels associated with a full frame) at the portions 160, 162 of the display screen 112 where the pixel changes represent the wheels segments 410, 420 spinning, a smaller number of pixels are processed during output of the animation 150, 152, resulting in reduced processing complexity and greater processing efficiency.

III. Example Sequence of Computer-Implemented Game

FIGS. 4-15 depict a sequence that is representative of one iteration of the computer-implemented game. In particular, FIGS. 4-15 depict the instances of graphical user interface 140 displayed on the display screen 112 at various times throughout the sequence. For ease of illustration and description, with respect to FIGS. 4-15, unless otherwise indicated, let's assume that the player selected the numbers "2", "13", "17", "27", and "34" as the user-selectable numbers 200, as depicted in FIG. 2. Additionally, let's assume that the primary winning number 142 is the number "34" and the trigger 144 is activated.

Figure 4:
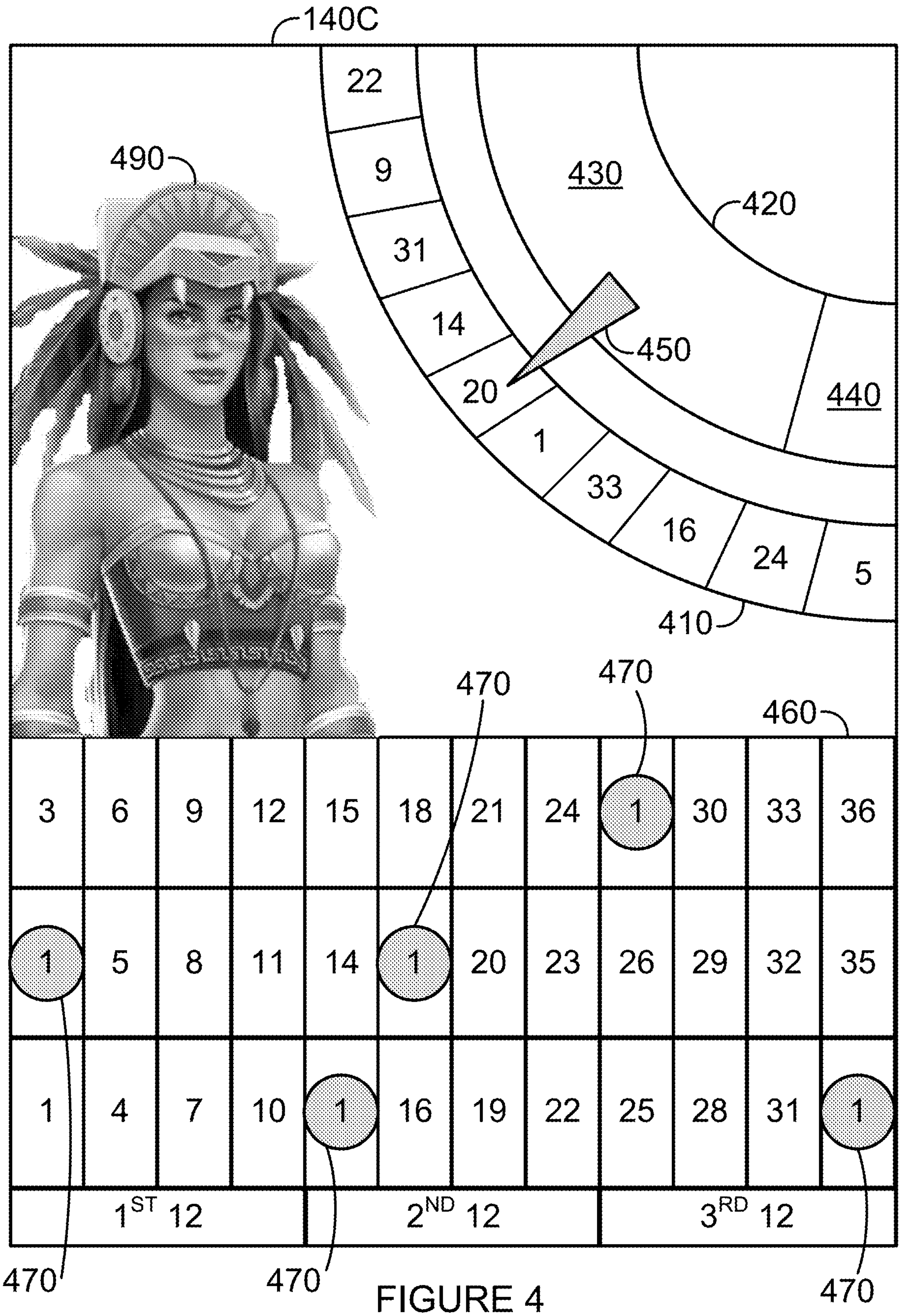
FIG. 4 is an example of a graphical user interface at a first time in a sequence that is representative of one iteration of the computer-implemented game in accordance with the example embodiments.

Referring to FIG. 4, an example of a graphical user interface 140C at a first time in a sequence that is representative of one iteration of the computer-implemented game is illustrated. The graphical user interface 140C depicts the first wheel segment 410, the second wheel segment 420, and the selection indicia 450. The graphical user interface 140C also depicts, within a betting board 460, the selections from the user-selectable numbers 200 and the corresponding wagers 470 that the player made using the graphical user interface 140A depicted in FIG. 2.

In the snapshot of the sequence depicted in FIG. 4, the first wheel segment 410 is spinning in a circular manner (e.g., a clockwise manner or a counter-clockwise manner). The first wheel segment 410 in FIG. 4 is indicative of a snapshot (at the first time) of frame components in the first sequence of frame components 154 played out at the first portion 160 of the display screen 112. In FIG. 4, the first wheel segment 410 has a plurality of numbered positions, and each number of the plurality of numbers is associated with a corresponding position of the plurality of numbered positions. For example, in FIG. 4, the first wheel segment 410 depicts a position associated with number "22", a position associated with number "9", a position associated with number "31", a position associated with number "14", a position associated with number "20", a position associated with number "1", a position associated with number "33", a position associated with number "16", a position associated with number "24", and a position associated with number "5". The selection indicia 450 is pointing to the position associated with number "20" in this snapshot of the sequence. A person having ordinary skill in the art will understand that at least a portion of an animation depicting the first wheel segment 410 can depict the first wheel segment 410 spinning at a rate at which a user cannot decipher the plurality of numbered positions.

In the snapshot of the sequence depicted in FIG. 4, the second wheel segment 420 is also spinning in a circular manner (e.g., a clockwise manner or a counter-clockwise manner). The second wheel segment 420 in FIG. 4 is indicative of a snapshot (at the first time) of frame components in the second sequence of frame components 156 played out at the second portion 162 of the display screen 112. In FIG. 4, the second wheel segment 420 has a trigger activation region 430 and a trigger deactivation region 440. The selection indicia 450 is pointing to the trigger activation region 430 in this snapshot of the sequence. A person having ordinary skill in the art will understand that at least a portion of an animation depicting the second wheel segment 420 can depict the second wheel segment 420 spinning at a rate at which a user cannot decipher which region the second wheel segment 420 is pointed to by the selection indicia 450. The first wheel segment 410 and the second wheel segment 420 can spin at the same or different angular rates.

Figure 5:
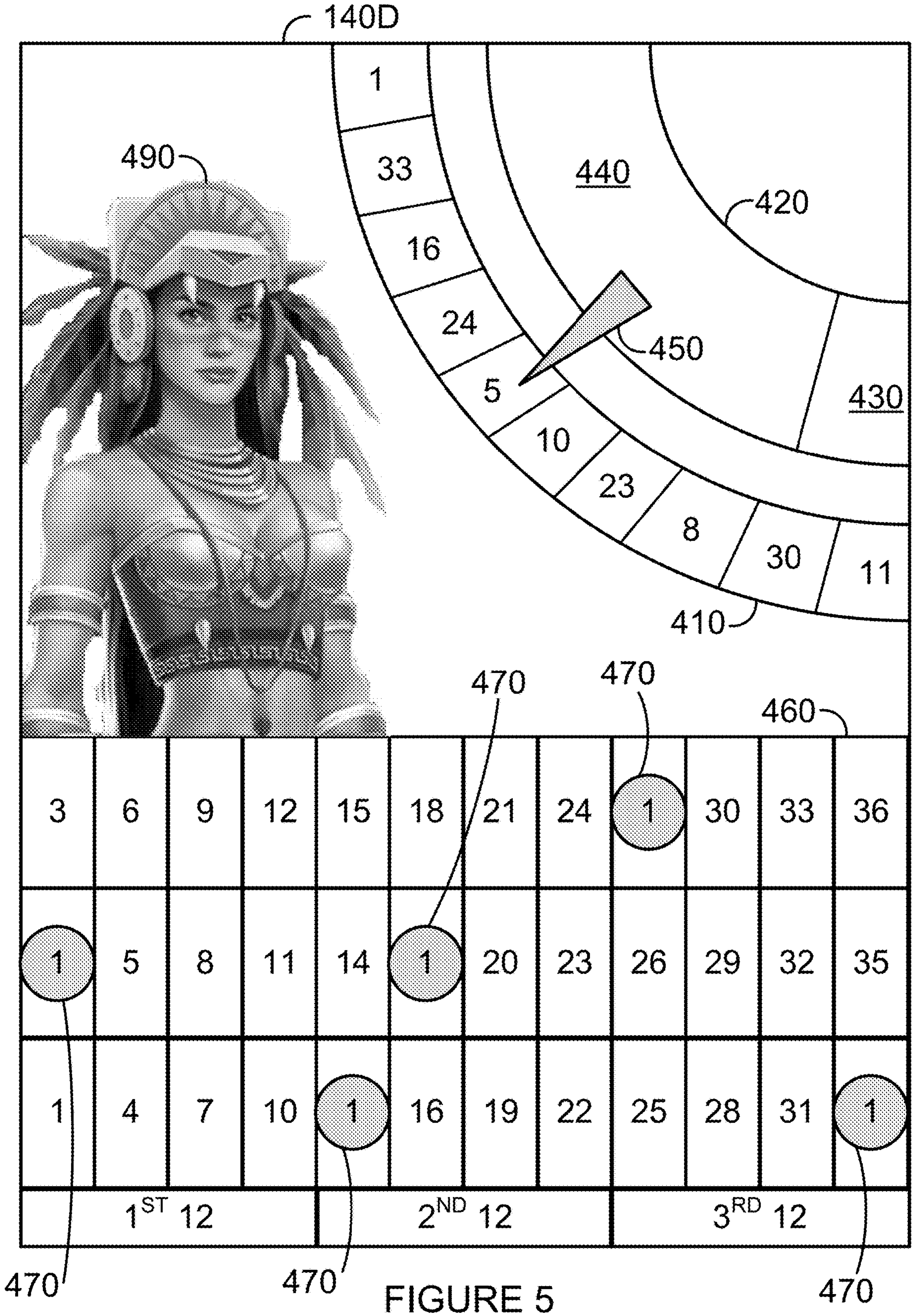
FIG. 5 is an example of a graphical user interface at a second time in the sequence in accordance with the example embodiments.

Referring to FIG. 5, an example of a graphical user interface 140D at a second time in the sequence is illustrated. The graphical user interface 140D depicts the first wheel segment 410, the second wheel segment 420, and the selection indicia 450. The graphical user interface 140D also depicts the selections from the user-selectable numbers 200 and the corresponding wagers that the player made using the graphical user interface 140A depicted in FIG. 2.

In the snapshot of the sequence depicted in FIG. 5, the first wheel segment 410 is still spinning in the circular manner. The first wheel segment 410 in FIG. 5 is indicative of a snapshot (at the second time) of frame components in the first sequence of frame components 154 played out at the first portion 160 of the display screen 112. In FIG. 5, the first wheel segment 410 has a plurality of numbered positions, and each number of the plurality of numbers is associated with a corresponding position of the plurality of numbered positions. For example, in FIG. 5, the first wheel segment 410 depicts a position associated with number "1", a position associated with number "33", a position associated with number "16", a position associated with number "24", a position associated with number "5", a position associated with number "10", a position associated with number "23", a position associated with number "8", a position associated with number "30", and a position associated with number "11". The selection indicia 450 is pointing to the position associated with number "5" in this snapshot of the sequence.

In the snapshot of the sequence depicted in FIG. 5, the second wheel segment 420 is also still spinning in the circular manner. The second wheel segment 420 in FIG. 5 is indicative of a snapshot (at the second time) of frame components in the second sequence of frame components 156 played out at the second portion 162 of the display screen 112. In FIG. 5, the second wheel segment 420 has the trigger activation region 430 and the trigger deactivation region 440. The selection indicia 450 is pointing to the trigger deactivation region 440 in this snapshot of the sequence.

Figure 6:
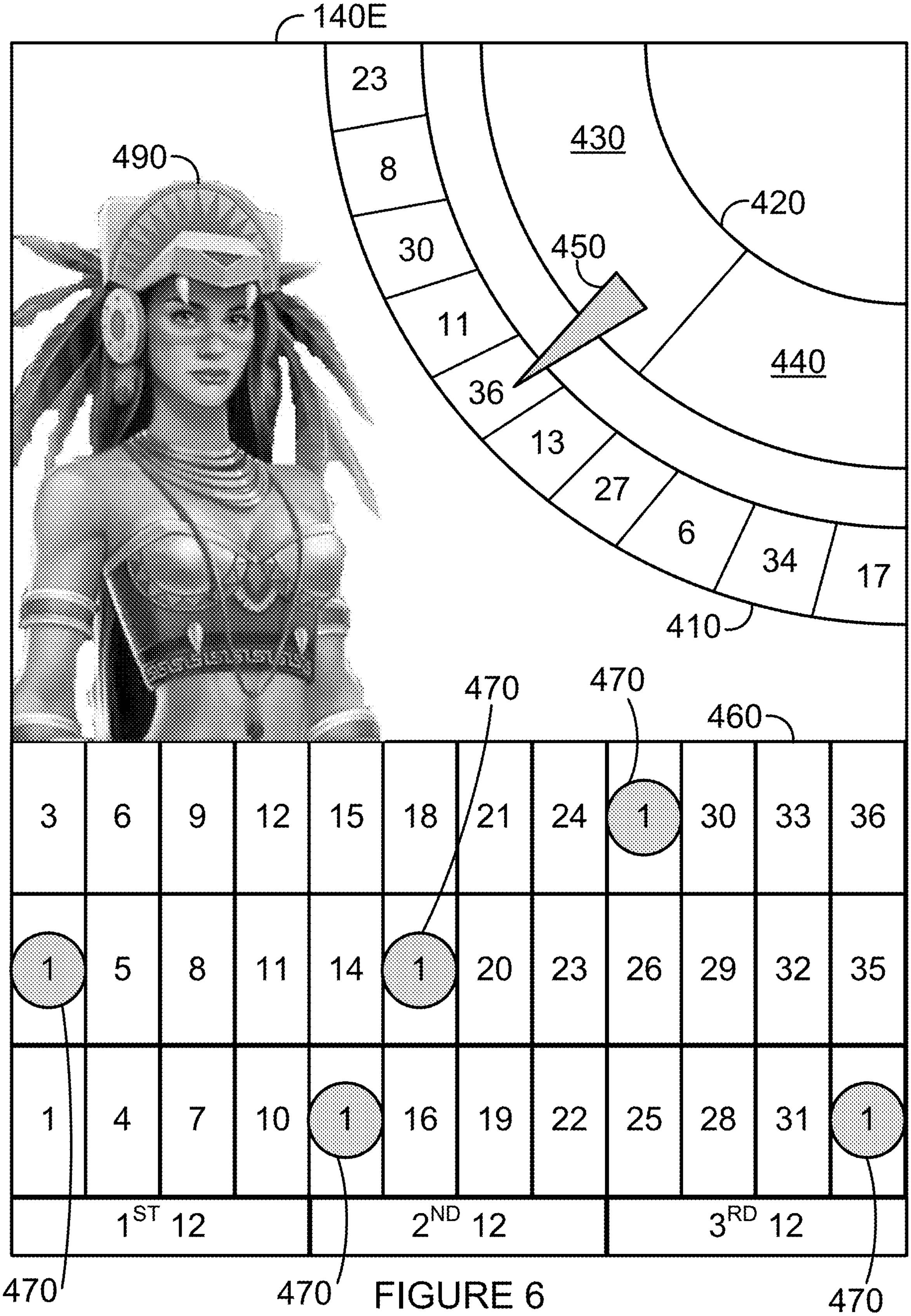
FIG. 6 is an example of a graphical user interface at a third time in the sequence in accordance with the example embodiments.

Referring to FIG. 6, an example of a graphical user interface 140E at a third time in the sequence is illustrated. The graphical user interface 140E depicts the first wheel segment 410, the second wheel segment 420, and the selection indicia 450. The graphical user interface 140E also depicts the selections from the user-selectable numbers 200 and the corresponding wagers that the player made using the graphical user interface 140A depicted in FIG. 2.

In the snapshot of the sequence depicted in FIG. 6, the first wheel segment 410 is still spinning in the circular manner. The first wheel segment 410 in FIG. 6 is indicative of a snapshot (at the third time) of frame components in the first sequence of frame components 154 played out at the first portion 160 of the display screen 112. In FIG. 6, the first wheel segment 410 has a plurality of numbered positions, and each number of the plurality of numbers is associated with a corresponding position of the plurality of numbered positions. For example, in FIG. 6, the first wheel segment 410 depicts a position associated with number "23", a position associated with number "8", a position associated with number "30", a position associated with number "11", a position associated with number "36", a position associated with number "13", a position associated with number "27", a position associated with number "6", a position associated with number "34", and a position associated with number "17". The selection indicia 450 is pointing to the position associated with number "36" in this snapshot of the sequence.

In the snapshot of the sequence depicted in FIG. 6, the second wheel segment 420 is also still spinning in the circular manner. The second wheel segment 420 in FIG. 6 is indicative of a snapshot (at the third time) of frame components in the second sequence of frame components 156 played out at the second portion 162 of the display screen 112. In FIG. 6, the second wheel segment 420 has the trigger activation region 430 and the trigger deactivation region 440. The selection indicia 450 is pointing to the trigger activation region 430 in this snapshot of the sequence.

Figure 7:
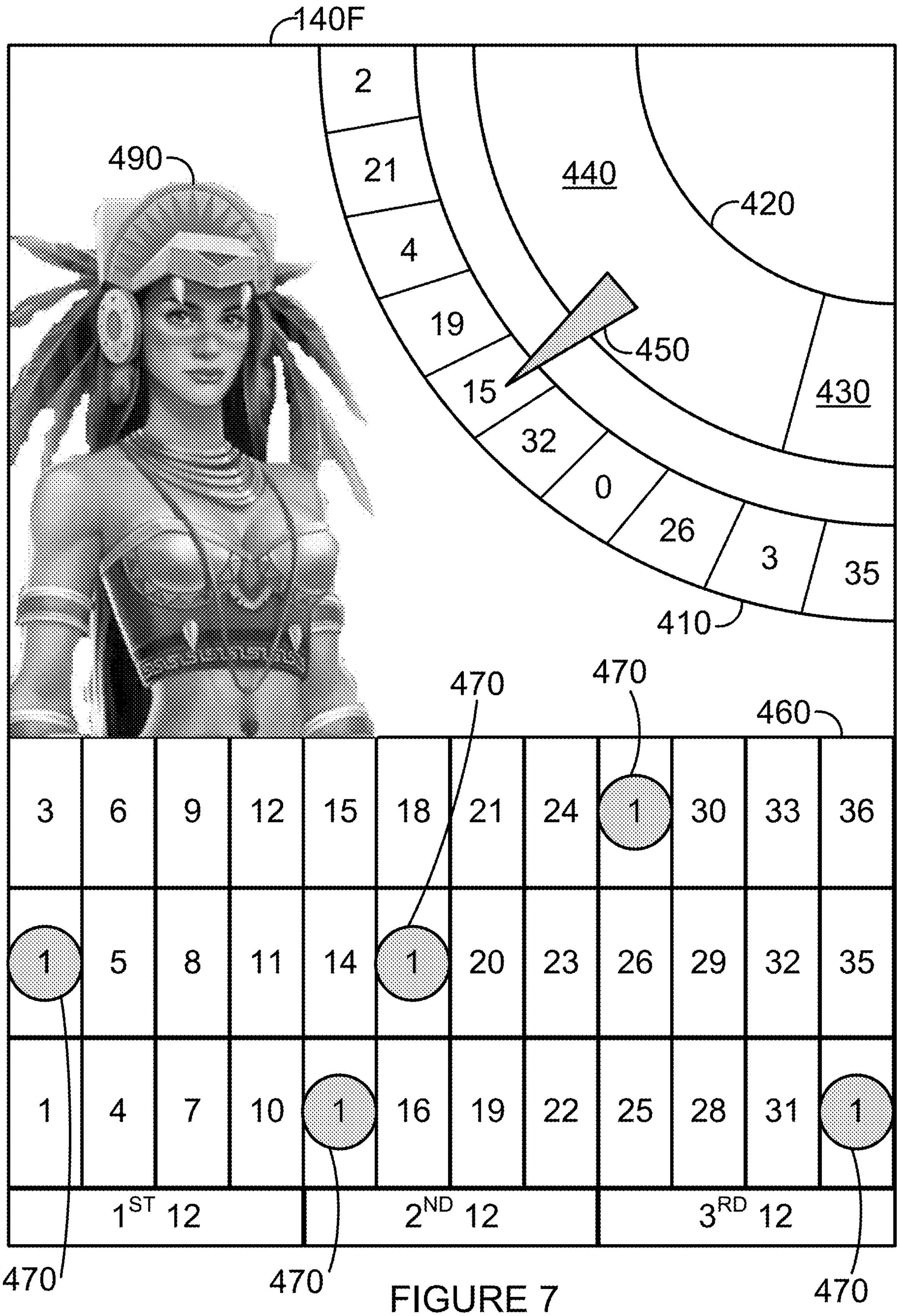
FIG. 7 is an example of a graphical user interface at a fourth time in the sequence in accordance with the example embodiments.

Referring to FIG. 7, an example of a graphical user interface 140F at a fourth time in the sequence is illustrated. The graphical user interface 140F depicts the first wheel segment 410, the second wheel segment 420, and the selection indicia 450. The graphical user interface 140F also depicts the selections from the user-selectable numbers 200 and the corresponding wagers that the player made using the graphical user interface 140A depicted in FIG. 2.

In the snapshot of the sequence depicted in FIG. 7, the first wheel segment 410 is still spinning in the circular manner. The first wheel segment 410 in FIG. 7 is indicative of a snapshot (at the fourth time) of frame components in the first sequence of frame components 154 played out at the first portion 160 of the display screen 112. In FIG. 7, the first wheel segment 410 has a plurality of numbered positions, and each number of the plurality of numbers is associated with a corresponding position of the plurality of numbered positions. For example, in FIG. 7, the first wheel segment 410 depicts a position associated with number "2", a position associated with number "21", a position associated with number "4", a position associated with number "19", a position associated with number "15", a position associated with number "32", a position associated with number "0", a position associated with number "26", a position associated with number "3", and a position associated with number "35". The selection indicia 450 is pointing to the position associated with number "15" in this snapshot of the sequence.

In the snapshot of the sequence depicted in FIG. 7, the second wheel segment 420 is also still spinning in the circular manner. The second wheel segment 420 in FIG. 7 is indicative of a snapshot (at the fourth time) of frame components in the second sequence of frame components 156 played out at the second portion 162 of the display screen 112. In FIG. 7, the second wheel segment 420 has the trigger activation region 430 and the trigger deactivation region 440. The selection indicia 450 is pointing to the trigger deactivation region 440 in this snapshot of the sequence.

Figure 8:
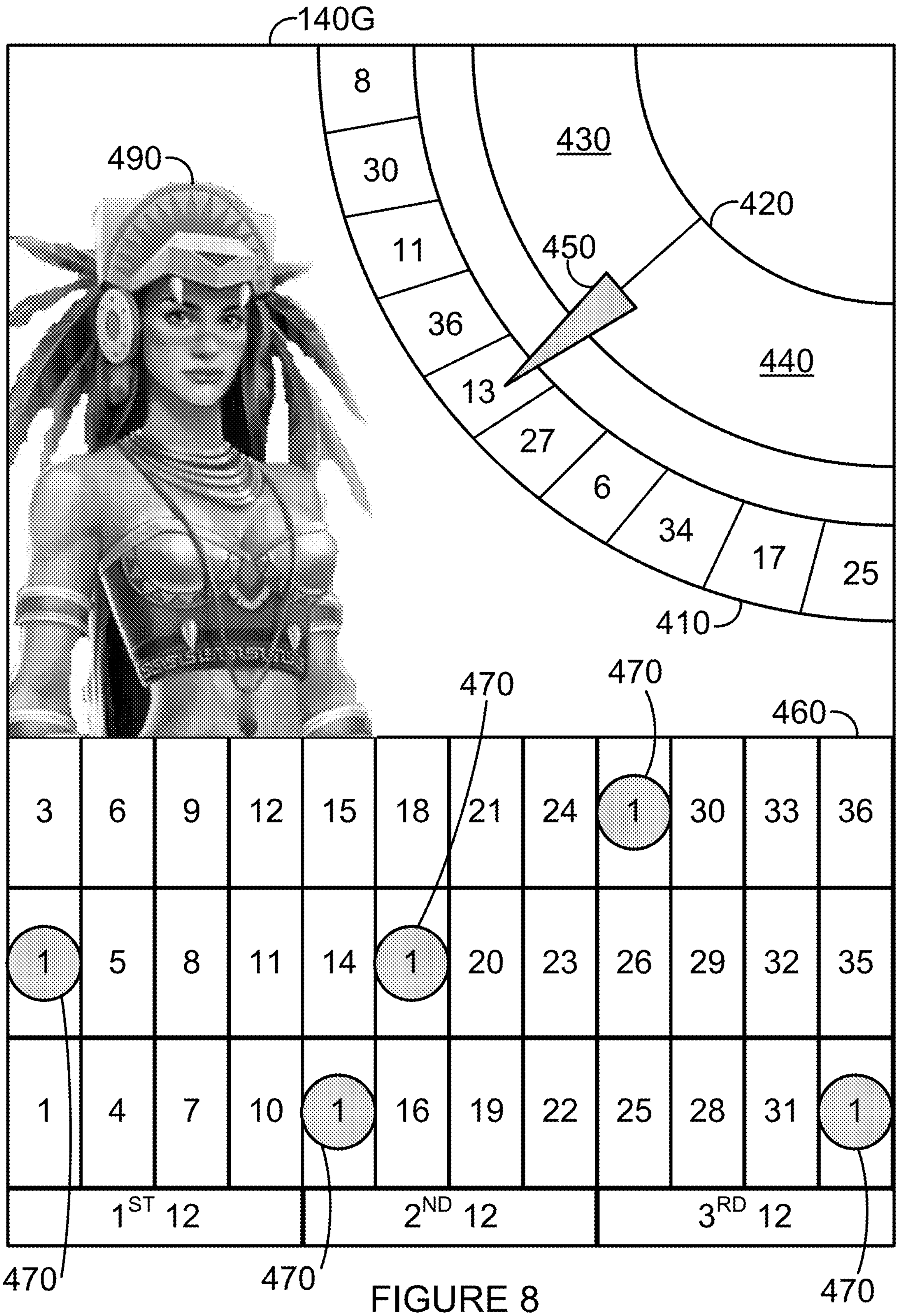
FIG. 8 is an example of a graphical user interface at a fifth time in the sequence in accordance with the example embodiments.

Referring to FIG. 8, an example of a graphical user interface 140G at a fifth time in the sequence is illustrated. The graphical user interface 140G depicts the first wheel segment 410, the second wheel segment 420, and the selection indicia 450. The graphical user interface 140G also depicts the selections from the user-selectable numbers 200 and the corresponding wagers that the player made using the graphical user interface 140A depicted in FIG. 2.

In the snapshot of the sequence depicted in FIG. 8, the first wheel segment 410 is still spinning in the circular manner. The first wheel segment 410 in FIG. 8 is indicative of a snapshot (at the fifth time) of frame components in the first sequence of frame components 154 played out at the first portion 160 of the display screen 112. In FIG. 8, the first wheel segment 410 has a plurality of numbered positions, and each number of the plurality of numbers is associated with a corresponding position of the plurality of numbered positions. For example, in FIG. 8, the first wheel segment 410 depicts a position associated with number "8", a position associated with number "30", a position associated with number "11", a position associated with number "36", a position associated with number "13", a position associated with number "27", a position associated with number "6", a position associated with number "34", a position associated with number "17", and a position associated with number "25". The selection indicia 450 is pointing to the position associated with number "13" in this snapshot of the sequence.

In the snapshot of the sequence depicted in FIG. 8, the second wheel segment 420 is also still spinning in the circular manner. The second wheel segment 420 in FIG. 8 is indicative of a snapshot (at the fifth time) of frame components in the second sequence of frame components 156 played out at the second portion 162 of the display screen 112. In FIG. 8, the second wheel segment 420 has the trigger activation region 430 and the trigger deactivation region 440. The selection indicia 450 is pointing in between the trigger activation region 430 and trigger deactivation region 440 in this snapshot of the sequence.

Figure 9:
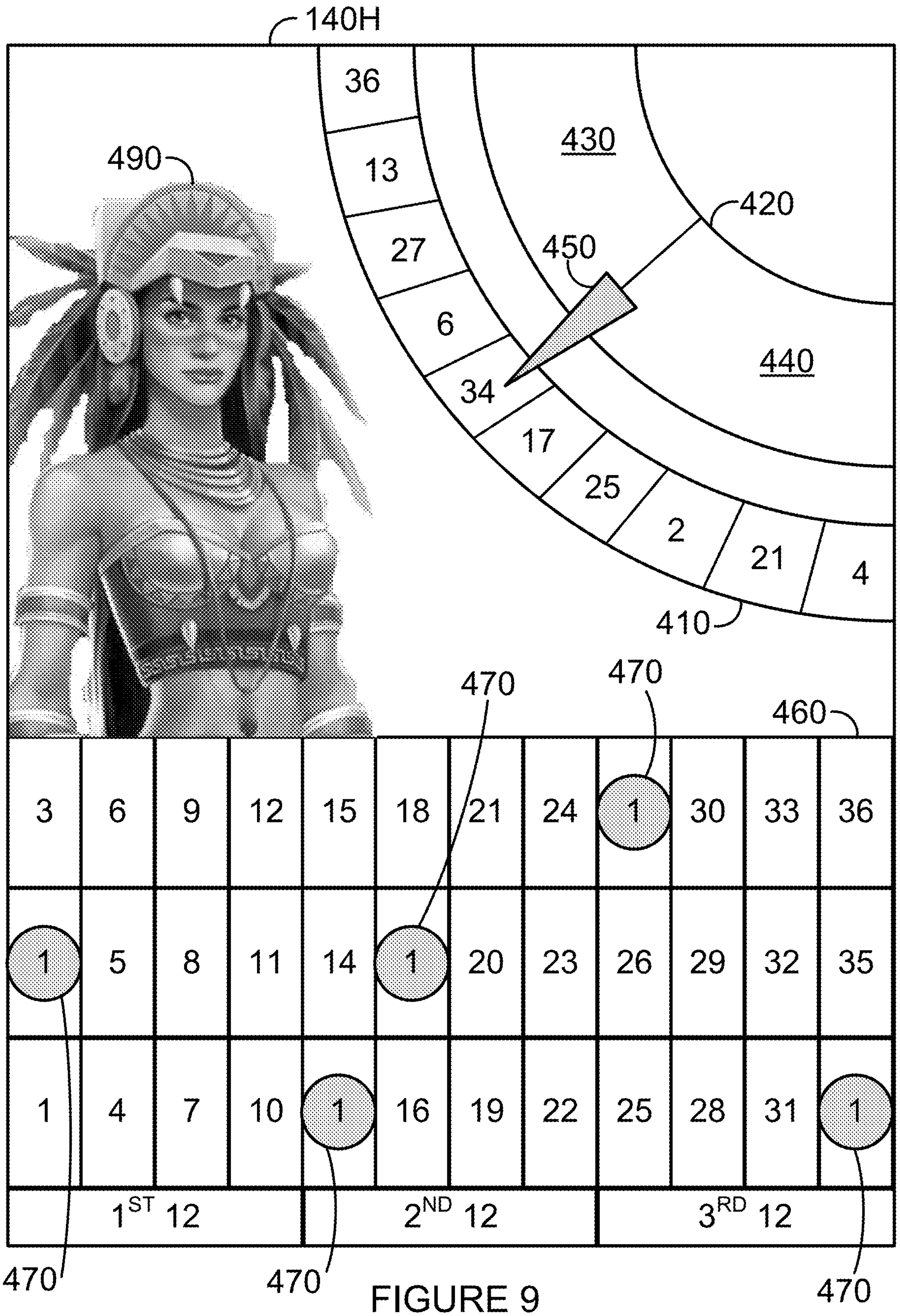
FIG. 9 is an example of a graphical user interface at a sixth time in the sequence in accordance with the example embodiments.

Referring to FIG. 9, an example of a graphical user interface 140H at a sixth time in the sequence is illustrated. The graphical user interface 140H depicts the first wheel segment 410, the second wheel segment 420, and the selection indicia 450. The graphical user interface 140H also depicts the selections from the user-selectable numbers 200 and the corresponding wagers that the player made using the graphical user interface 140A depicted in FIG. 2.

In the snapshot of the sequence depicted in FIG. 9, the first wheel segment 410 has stopped spinning in the circular manner. The first wheel segment 410 in FIG. 9 is indicative of a snapshot (at the sixth time) of frame components in the first sequence of frame components 154 played out at the first portion 160 of the display screen 112. In FIG. 9, the first wheel segment 410 has a plurality of numbered positions, and each number of the plurality of numbers is associated with a corresponding position of the plurality of numbered positions. For example, in FIG. 9, the first wheel segment 410 depicts a position associated with number "36", a position associated with number "13", a position associated with number "27", a position associated with number "6", a position associated with number "34", a position associated with number "17", a position associated with number "25", a position associated with number "2", a position associated with number "21", and a position associated with number "4". The selection indicia 450 is pointing to the position associated with number "34" in this snapshot of the sequence. Thus, because the first wheel segment 410 stopped spinning, the graphical user interface 140H indicates that the primary winning number 142 is the number "34", as determined by the primary winning number generator 116.

In the snapshot of the sequence depicted in FIG. 9, the second wheel segment 420 is still spinning in the circular manner. The second wheel segment 420 in FIG. 9 is indicative of a snapshot (at the sixth time) of frame components in the second sequence of frame components 156 played out at the second portion 162 of the display screen 112. In FIG. 9, the second wheel segment 420 has the trigger activation region 430 and the trigger deactivation region 440. The selection indicia 450 is pointing in between the trigger activation region 430 and trigger deactivation region 440 in this snapshot of the sequence.

Figure 10:
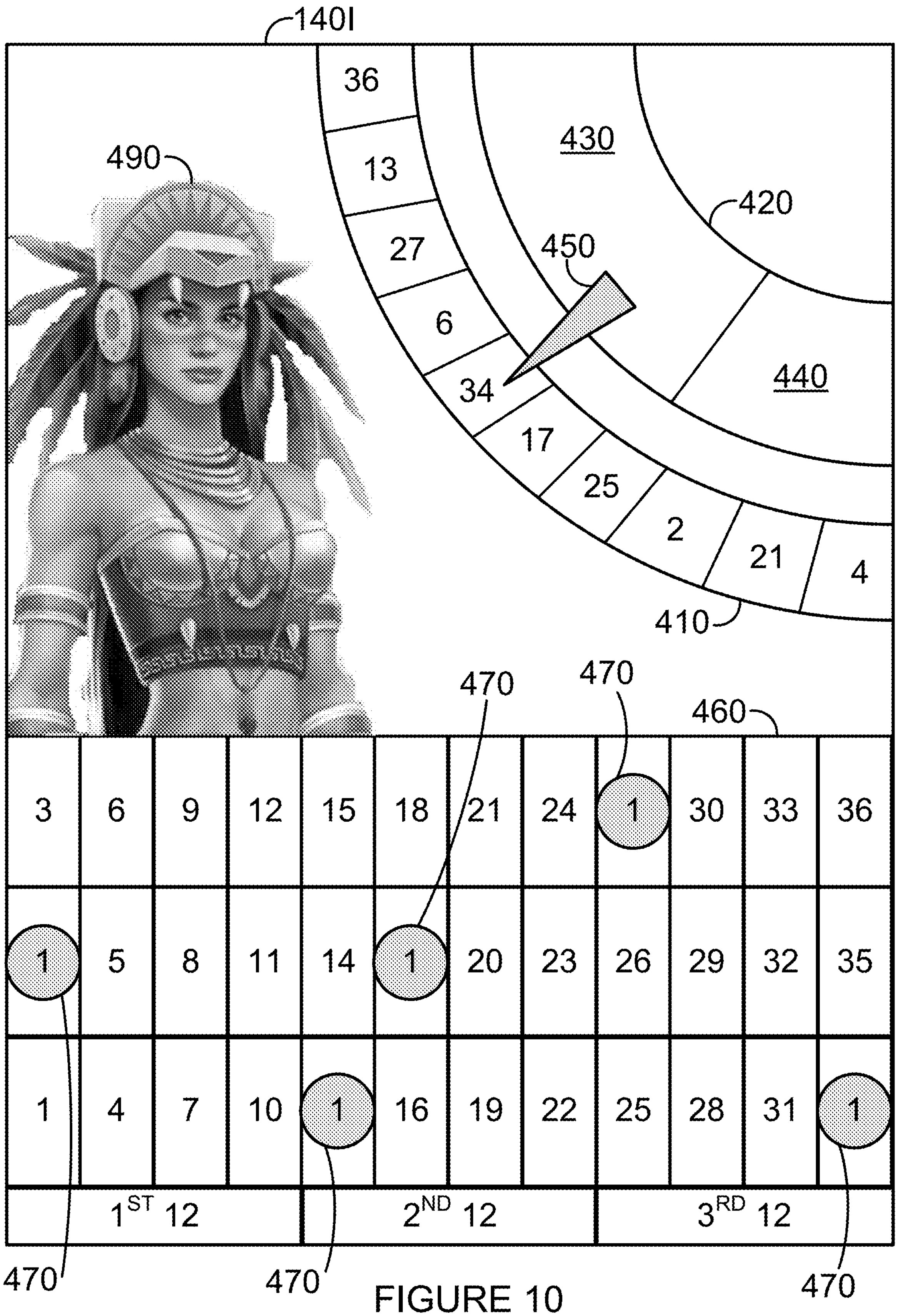
FIG. 10 is an example of a graphical user interface at a seventh time in the sequence in accordance with the example embodiments.

Referring to FIG. 10, an example of a graphical user interface 140I at a seventh time in the sequence is illustrated. The graphical user interface 140I depicts the first wheel segment 410, the second wheel segment 420, and the selection indicia 450. The graphical user interface 140I also depicts the selections from the user-selectable numbers 200 and the corresponding wagers that the player made using the graphical user interface 140A depicted in FIG. 2.

In the snapshot of the sequence depicted in FIG. 10, the first wheel segment 410 remains fixed (e.g., stopped) and thus has a similar orientation as depicted with respect to FIG. 9. The selection indicia 450 is still pointing to the position associated with number "34" in this snapshot of the sequence, indicating that the primary winning number 142 is the number "34".

In the snapshot of the sequence depicted in FIG. 10, the second wheel segment 420 has stopped spinning in the circular manner. The second wheel segment 420 in FIG. 10 is indicative of a snapshot (at the seventh time) of frame components in the second sequence of frame components 156 played out at the second portion 162 of the display screen 112. In FIG. 10, the second wheel segment 420 has the trigger activation region 430 and the trigger deactivation region 440. The selection indicia 450 is pointing to the trigger activation region 430 in this snapshot of the sequence. Thus, because the second wheel segment 420 stopped spinning, the graphical user interface 140I indicates that the trigger 144 is activated for the sequence, as determined by the trigger unit 118.

Thus, as described with respect to FIGS. 9 and 10, the first wheel segment 410 with the roulette numbers can stop rotating before the second wheel segment 420 stops rotation. It should be understood that the rotation may stop in any order. For example, in other implementations, the second wheel segment 420 can stop rotating before the first wheel segment 410. As another example, the wheel segments 410, 420 can stop rotating at the same time.

As described above, FIGS. 4-10 depict movement of the first wheel segment 410 and movement of the second wheel segment 420. The first wheel segment 410 (e.g., the band of roulette numbers) can rotate clockwise (or counter-clockwise) on the outer periphery, and the second wheel segment 420 (e.g., the trigger mechanism on the inner disc) can rotate clockwise (or counter-clockwise) on the inner disc. In some scenarios, the first wheel segment 410 and the second wheel segment 420 can rotate in different directions. For example, one of the wheel segments 410, 420 can rotate clockwise, and the other of the wheel segments 410, 420 can rotate counter-clockwise. In some scenarios, the first wheel segment 410 and the second wheel segment 420 can rotate in the same direction. For example, both wheel segments 410, 420 can rotate clockwise, or both wheel segments 410, 420 can rotate counter-clockwise.

Figure 11:
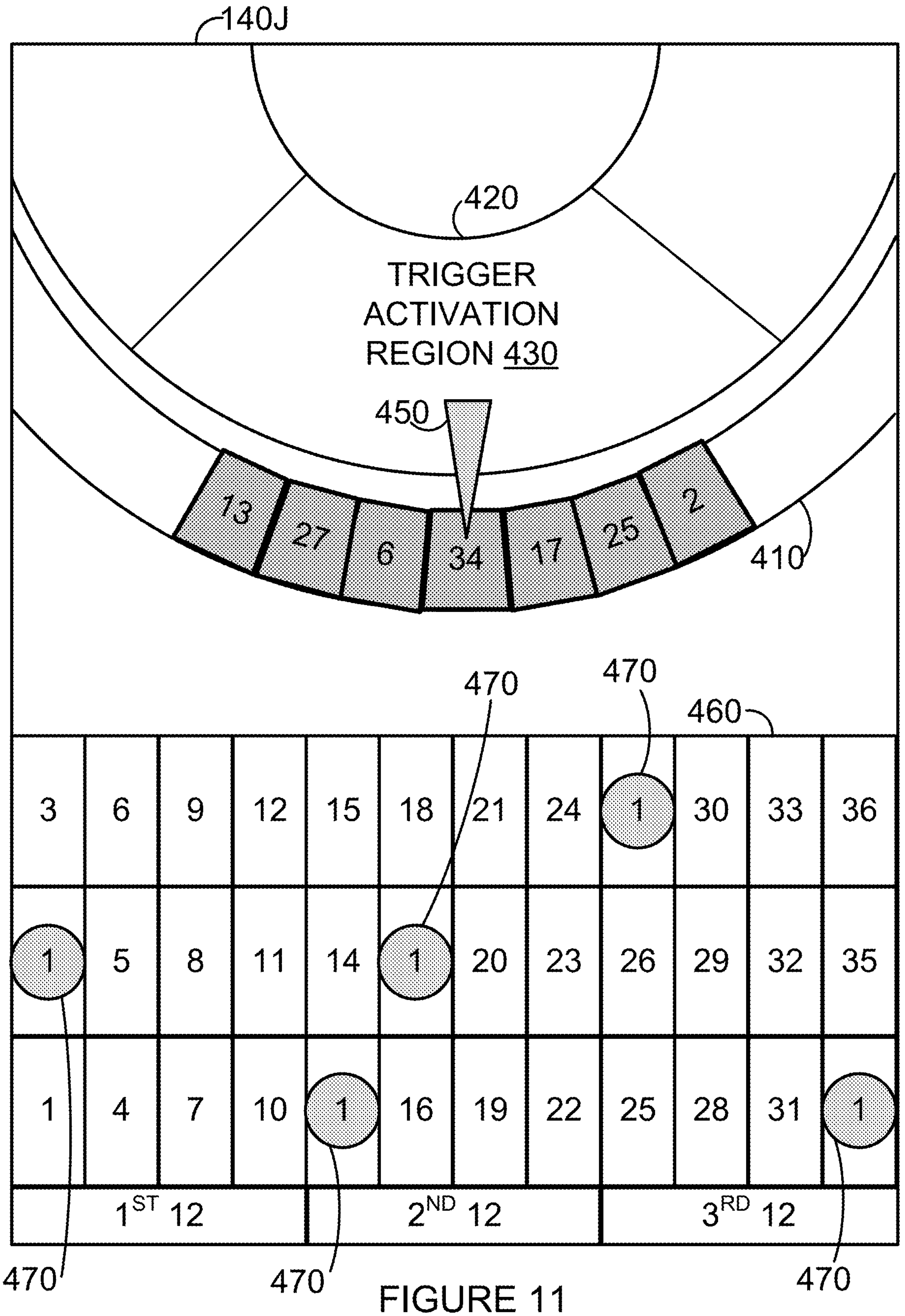
FIG. 11 is an example of a graphical user interface at an eighth time in the sequence in accordance with the example embodiments.

Referring to FIG. 11, an example of a graphical user interface 140J at an eighth time in the sequence is illustrated.

In the snapshot of the sequence depicted in FIG. 11, the first wheel segment 410 is moved into a central position on the graphical user interface 140J with the primary winning number (e.g., the number "34") in the middle. Because the trigger 144 is activated, the numbers adjacent to the primary winning number 142 (e.g., the numbers "13", "27", "6", "17", "25", and "2") have been turned into the additional winning numbers 146. Thus, after the animations 150, 152 stop, the selection indicia 450 highlights the group of numbers (e.g., the primary winning number 142 and the additional winning numbers 146) as winning numbers.

In FIG. 11, a random calculation has rendered three numbers on each side of the primary winning number 142 (e.g., the number "34") as the additional winning numbers 146. For example, the numbers "6", "27", and "13" are the numbers to the left of the primary winning number 142 designated as the additional winning numbers 146, and the numbers "17", "25", and "2" are the numbers to the right of the primary winning number 142 designated as the additional winning numbers 146. However, the random calculation could have also chosen one or two numbers adjacent the primary winning number 142 as the additional winning numbers 146. In alternate embodiments, more numbers may also be chosen. In at least some embodiments, the first wheel segment 410 shown in the graphical user interface 140J also includes other numbers of the first wheel segment 410 adjacent to an outmost winning number on the first wheel segment 410.

In at least some implementations, a payout can be output in connection with the graphical user interface 140J. As an example, each winning number (i.e., primary or additional) can be associated with a standard payout (e.g., 20:1) (i.e., the payout equals $20 for a $1 wager). As shown in FIG. 11, a $1 wager was placed on the primary winning number and four of the six additional winning numbers. Using the standard payout for all of those wagers, the payout would be $100 (i.e., $1×20 for additional winning number "2"+$1×20 for additional winning number "13", +$1×20 for additional winning number "17"+$1×20 for additional winning number "27"+$1×20 for primary winning number "34").

As another example, the payout can be based on different payout ratios (e.g., a 20:1 ratio for the primary winning number and 10:1 for any additional winning number). Based on that arrangement, the payout would be $60 (i.e., $1×10 for additional winning number "2"+$1×10 for additional winning number "13", +$1×10 for additional winning number "17"+$1×10 for additional winning number "27"+$1×20 for primary winning number "34").

As yet another example, the different payout ratios could be based on proximity of the additional winning number to the primary winning number (e.g., a 15:1 payout for an additional winning number adjacent the primary winning number, a 10:1 payout for an additional winning number two positions from the primary winning number, and a 5:1 payout for an additional winning number three positions from the primary winning number. Based on that arrangement, the payout would be $55 (i.e., $1×5 for additional winning number "2"+$1×5 for additional winning number "13", +$1×15 for additional winning number "17"+$1×10 for additional winning number "27"+$1×20 for primary winning number "34"). The aforementioned examples corresponding to FIG. 11 do not take into account any multiplier for use with the payout ratio.

Figure 12:
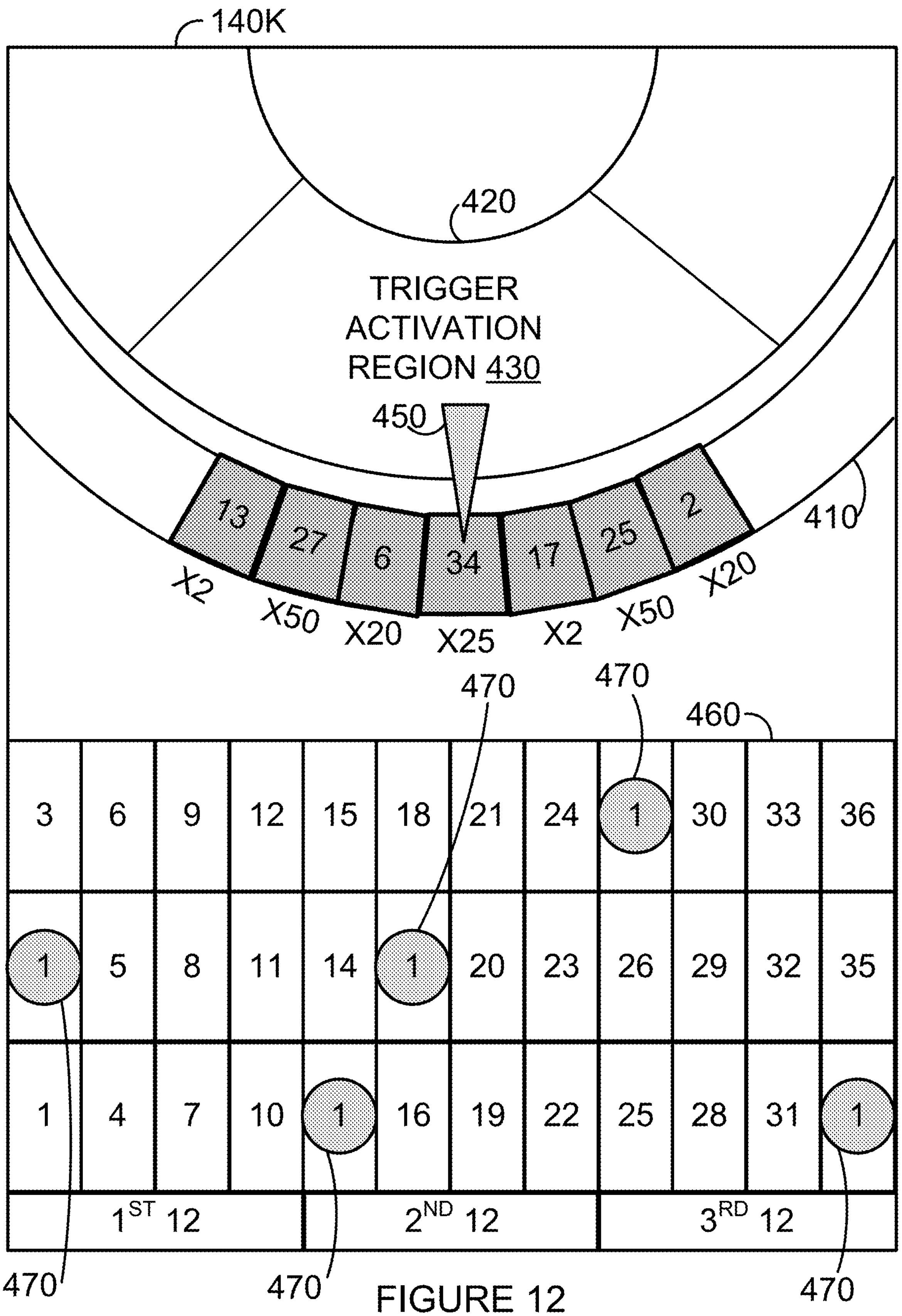
FIG. 12 is an example of a graphical user interface at a ninth time in the sequence in accordance with the example embodiments.

Referring to FIG. 12, an example of a graphical user interface 140K at a ninth time in the sequence is illustrated.

In the snapshot of the sequence depicted in FIG. 12, a random calculation is performed to determine a multiplier for each of the additional winning numbers 142, 146, and the winning numbers 142, 146 are highlighted.

In accordance with some embodiments, the wager or a payout can be multiplied by a multiplier. For example, as depicted in FIG. 12, any wager placed on the number "13"

or any payout on the number "13" is multiplied by two (2), any wager placed on the number "27" or any payout on the number "27" is multiplied by fifty (50), any wager placed on the number "6" or any payout on the number "6" is multiplied by twenty (20), any wager placed on the primary winning number 142 (e.g., the number "34") or any payout on the primary winning number "34" is multiplied by twenty-five (25), any wager placed on the number "17" or any payout on the number "17" is multiplied by two (2), any wager placed on the number "25" or any payout on the number "25" is multiplied by fifty (50), and any wager placed on the number "2" or any payout on the number "2" is multiplied by twenty (20).

In accordance with some other embodiments, the multiplier can be added to a payout (e.g., 20:1) before the wager is multiplied by the payout and multiplier. For example, as depicted in FIG. 12, any wager placed on the number "13" receives a payout based on the modified payout of 22:1, any wager placed on the number "27" receives a payout based on the modified payout of 70:1, any wager placed on the number "6" receives a payout based on the modified payout of 40:1, any wager placed on the primary winning number 142 (e.g., the number "34") receives a payout based on the modified payout of 45:1, any wager placed on the number "17" receives a payout based on the modified payout of 22:1, any wager placed on the number "25" receives a payout based on the modified payout of 70:1, and any wager placed on the number "2" receives a payout based on the modified payout of 40:1. Based on that example and the outcome shown in FIG. 12, the payout would be $199 (i.e., $1×40 for additional winning number "2"+$1×22 for additional winning number "13", +$1×22 for additional winning number "17"+$1×70 for additional winning number "27"+$1×45 for primary winning number "34").

As noted above, the payout can be based on different payout ratios (e.g., a 20:1 ratio for the primary winning number and 10:1 for any additional winning number). Based on that arrangement and the arrangement of adding multipliers to a payout ratio, any wager placed on the number "13" receives a payout based on the modified payout of 12:1, any wager placed on the number "27" receives a payout based on the modified payout of 60:1, any wager placed on the number "6" receives a payout based on the modified payout of 30:1, any wager placed on the primary winning number 142 (e.g., the number "34") receives a payout based on the modified payout of 45:1, any wager placed on the number "17" receives a payout based on the modified payout of 12:1, any wager placed on the number "25" receives a payout based on the modified payout of 60:1, and any wager placed on the number "2" receives a payout based on the modified payout of 30:1. Based on that example and the outcome shown in FIG. 12, the payout would be $159 (i.e., $1×30 for additional winning number "2"+$1×12 for additional winning number "13", +$1×12 for additional winning number "17"+$1×60 for additional winning number "27"+ $1×45 for primary winning number "34").

As further noted above, the different payout ratios could be based on proximity of the additional winning number to the primary winning number (e.g., a 15:1 payout for an additional winning number adjacent the primary winning number, a 10:1 payout for an additional winning number two positions from the primary winning number, and a 5:1 payout for an additional winning number three positions from the primary winning number. Based on that arrangement and the arrangement of adding multipliers to a payout ratio, any wager placed on the number "13" receives a payout based on the modified payout of 7:1, any wager placed on the number "27" receives a payout based on the modified payout of 60:1, any wager placed on the number "6" receives a payout based on the modified payout of 35:1, any wager placed on the primary winning number 142 (e.g., the number "34") receives a payout based on the modified payout of 45:1, any wager placed on the number "17" receives a payout based on the modified payout of 17:1, any wager placed on the number "25" receives a payout based on the modified payout of 60:1, and any wager placed on the number "2" receives a payout based on the modified payout of 25:1. Based on that example and the outcome shown in FIG. 12, the payout would be $154 (i.e., $1×25 for additional winning number "2"+$1×7 for additional winning number "13", +$1×17 for additional winning number "17"+ $1×60 for additional winning number "27"+$1×45 for primary winning number "34").

Thus, the multipliers increase the player's winnings by the indicated multiple. Although the primary winning number 142 in FIG. 12 has a lower multiplier than some of the additional winning numbers 146, in some implementations of the computer-implemented game, the multiplier for primary winning number 142 is always greater than the multiplier for the additional winning numbers 146.

Figure 13:
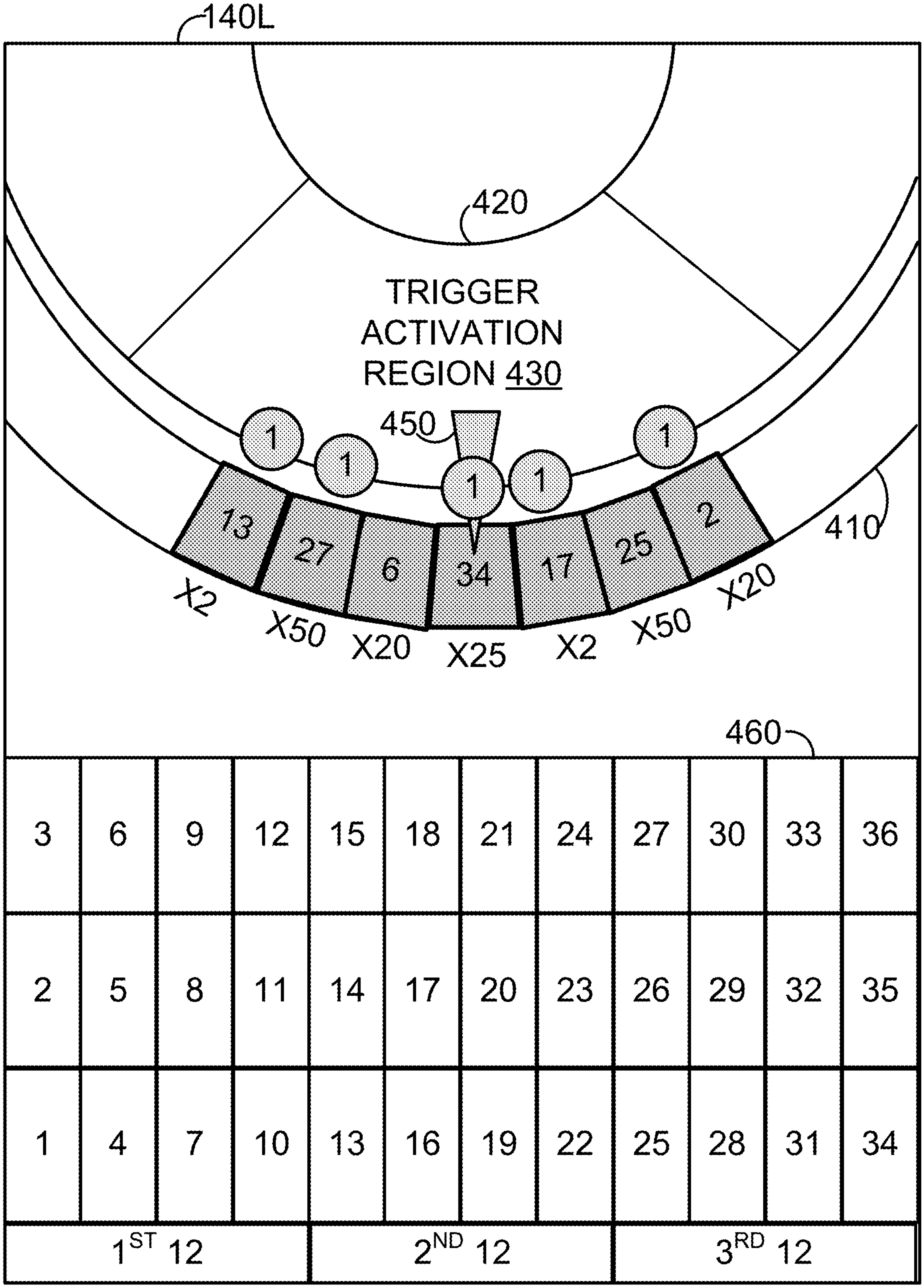
FIG. 13 is an example of a graphical user interface at a tenth time in the sequence in accordance with the example embodiments.

Referring to FIG. 13, an example of a graphical user interface 140L at a tenth time in the sequence is illustrated. In the snapshot of the sequence depicted in FIG. 13, the wagers previously shown on the betting board are moved up to the roulette wheel segment 410, which provides a visual illustration of the player's results.

Figure 14:
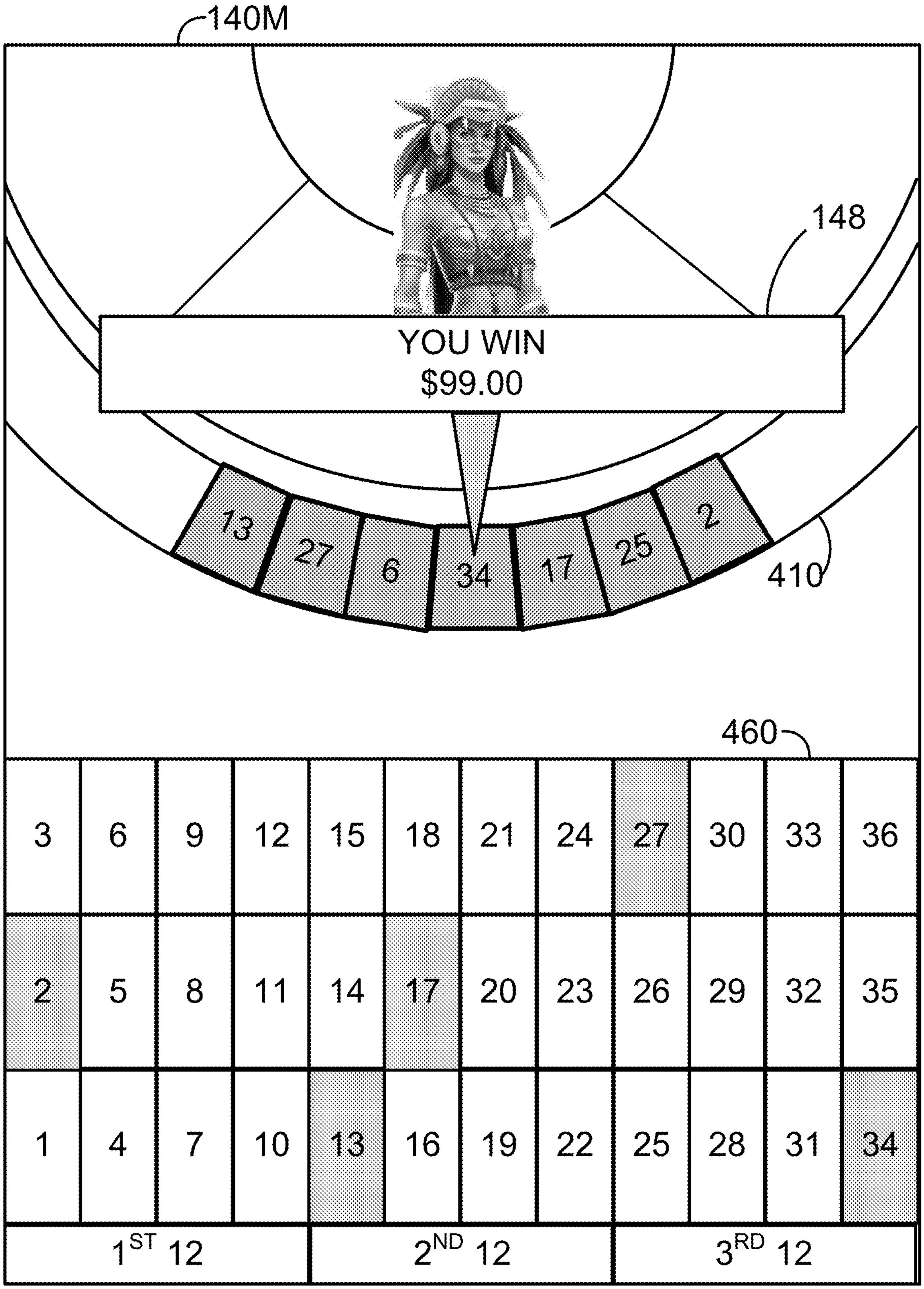
FIG. 14 is an example of a graphical user interface at an eleventh time in the sequence in accordance with the example embodiments.

Referring to FIG. 14, an example of a graphical user interface 140M at an eleventh time in the sequence is illustrated. In the snapshot of the sequence depicted in FIG. 14, the award 148 is depicted. For example, the player's award 148 for the sequence of the computer-implemented game is ninety-nine dollars ($99.00). The player's award 148 shown in FIG. 14 can be based on the arrangement discussed above in which the award is determined by multiplying the wager on a winning number by the multiplier corresponding to the winning number. A person having ordinary skill in the art will understand that the player's award 148 can be based on a different payout determination, such as one of the other payout determinations described above. In the graphical user interface 140M, the betting board 460 indicates the user-selected numbers corresponding to the player's wagers made using the graphical user interface 140A in FIG. 2 using highlighting. The betting board 460 of the graphical user interface 140L in FIG. 13 could indicate the user-selected numbers using highlighting or in some other manner.

Figure 15:
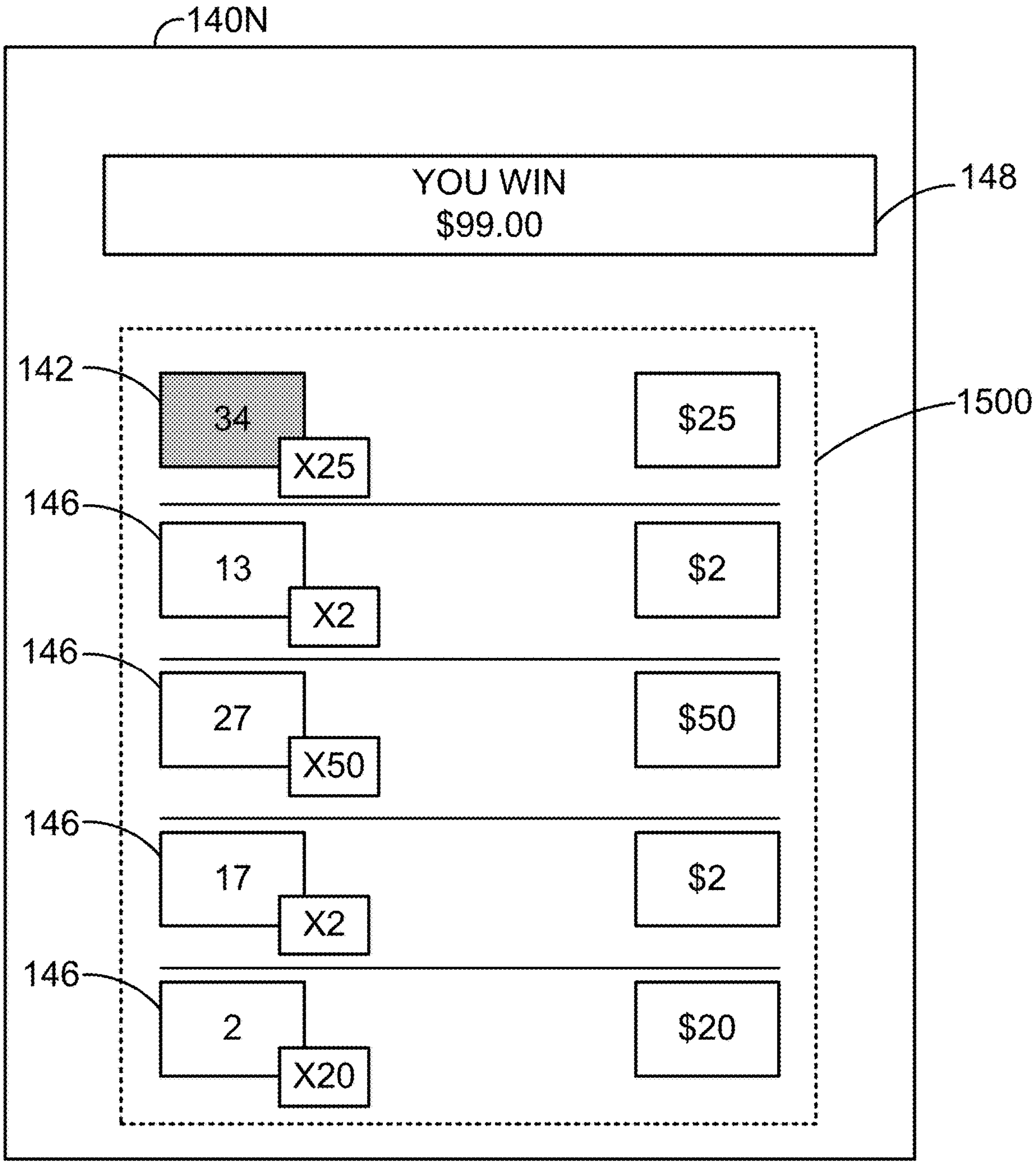
FIG. 15 is an example of a graphical user interface at the end of the sequence in accordance with the example embodiments.

Referring to FIG. 15, an example of a graphical user interface 140N at the end of the sequence is illustrated. In the snapshot of the sequence depicted in FIG. 15, a breakdown 1500 of the award 148 is depicted.

According to the breakdown 1500, the player is awarded twenty-five dollars ($25.00) for wagering one dollar ($1.00) on the number "34" (e.g., the primary winning number 142), the player is awarded two dollars ($2.00) for wagering one dollar ($1.00) on the number "13" (e.g., an additional winning number 146), the player is awarded fifty dollars ($50.00) for wagering one dollar ($1.00) on the number "27" (e.g., an additional winning number 146), the player is awarded two dollars ($2.00) for wagering one dollar ($1.00) on the number "17" (e.g., an additional winning number 146), and the player is awarded twenty dollars ($20.00) for wagering one dollar ($1.00) on the number "2" (e.g., an additional winning number 146).

The sequence of the computer-implemented game described with respect to FIGS. 4-15 increases the player's odds of selecting a winning number during an iteration of the computer-implemented game, without having to wager additional money. For example, if the trigger 144 is activated, additional winning numbers 146 are generated, which increases the player's odds of winning, and thus makes the user experience more enjoyable.

Returning back to FIG. 10, if on the other hand, the selection indicia 450 is pointing to the trigger deactivation region 440 instead of the trigger activation region 430, the primary winning number 142 would be "34" such that the payout without any multiplier would be the wager times the standard payout for the game implementation (e.g., 20:1) (i.e., the payout equals $20 for a $1 wager). In at least some implementations, a multiplier number may randomly be assigned to the primary winning number 142 when the selection indicia 450 points to the trigger deactivation region 440. For an outcome in which the selection indicia 450 points to the trigger deactivation region 440, the graphical user interface 140 can show the player's award 148 similar to graphical user interface 140M of FIG. 14 except the roulette wheel segment 410 would not highlight any additional winning number.

A person having ordinary skill in the art will understand that the graphical user interface 140C to 140M shown in FIG. 4 to FIG. 14 can show an entirety of the first roulette wheel segment 410 (e.g., show all numbered positions of the plurality of numbered positions of the first wheel segment 410), and show an entirety of the second wheel segment 420 (e.g., show all activation and deactivation regions of the second wheel segment 420). The implementations that show a portion of the first wheel segment 410 and the second wheel segment 420 are especially beneficial when the player is performing the game on a computing system with a relatively small display screen, such as a smart phone or tablet computing system.

IV. Example Method

Figure 16:
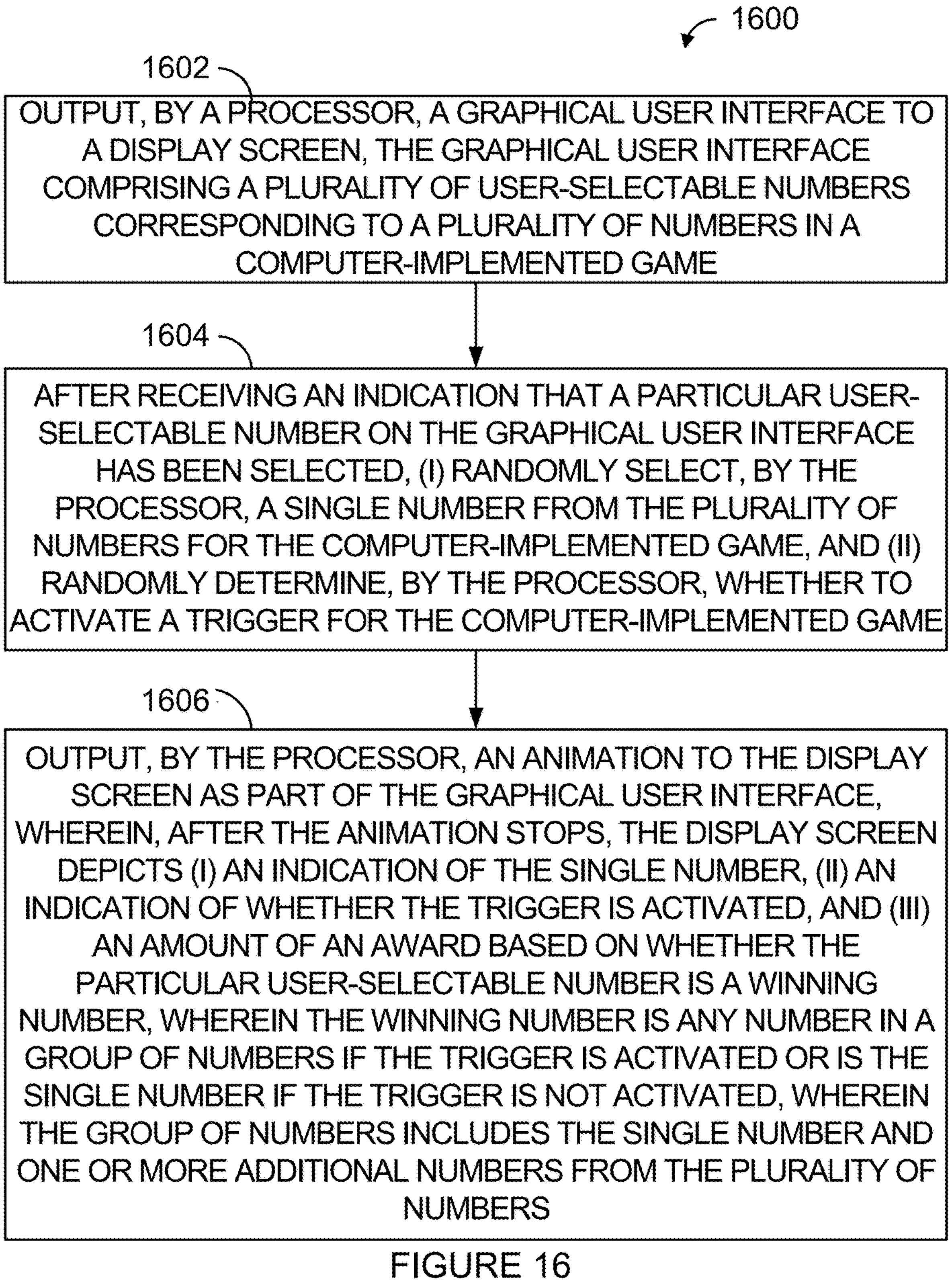
FIG. 16 is a flowchart showing an example method in accordance with the example embodiments.

FIG. 16 illustrates a flowchart showing an example method 1600. The method 1600 can be performed by the machine 100 of FIG. 1. In particular, the method 1600 can be performed by the processor 102 of FIG. 1.

The method 1600 includes outputting, by a processor, a graphical user interface to a display screen, at block 1602. The graphical user interface includes a plurality of user-selectable numbers corresponding to a plurality of numbers in a computer-implemented game. For example, the processor 102 outputs the graphical user interface 140 to the display screen 112. The graphical user interface 140A includes the plurality of user-selectable numbers 200 corresponding to the plurality of numbers in the roulette game.

At block 1604, after receiving an indication that a particular user-selectable number on the graphical user interface has been selected, the method 1600 includes randomly selecting, by the processor, a single number from the plurality of numbers for the computer-implemented game. For example, after receiving the indication that the user-selectable numbers 200 (e.g., the numbers "2", "13", "17", "27", and "34") on the graphical user interface 140A have been selected, the graphical user interface generator 114 randomly selects the primary winning number 142 (e.g., the "single number" according to the method 1600) from the plurality of numbers for the roulette game. The method 1600 also includes randomly determining, by the processor, whether to activate a trigger for the computer-implemented game. For example, trigger unit 118 randomly determines whether to activate the trigger 144 for the roulette game.

The method 1600 also includes outputting, by the processor, an animation to the display screen as part of the graphical user interface, at block 1606. For example, the processor 102 outputs the animations 150, 152 to the display screen 112 as part of the graphical user interface. According to the method 1600, after animation stops, the display screen depicts (i) an indication of the single number, (ii) an indication of whether the trigger is activated, and (iii) an amount of an award based on whether the particular user-selectable number is a winning number. For example, after the animations 150, 152 stop (e.g., after the first wheel segment 410 and the second wheel segment 420 stop rotating), the display screen depicts an indication of the primary winning number 142, and indication of whether the trigger 144 is activated, and the award 148. According to the method 1600, the winning number is any number in a group of numbers if the trigger is activated or is the single number if the trigger is not activated. The group of numbers includes the single number and one or more additional numbers.

According to one implementation of the method 1600, outputting the animation includes outputting a first animation 150 to a first portion 160 of the display screen 112 and outputting a second animation 152 to a second portion 162 of the display screen 112. The first animation 150 is associated with the indication of the single number (e.g., the primary winning number 132), and the second animation 152 is associated with the indication of whether the trigger 144 is activated.

According to one implementation of the method 1600, outputting the first animation includes initiating playback of a first sequence of frame components 154. A last frame component of the first sequence of frame components depicts at least the single number (e.g., the primary winning number 142). Outputting the first animation further includes outputting the playback of the first sequence of frame components 154 at the first portion 160 of the display screen 112.

According to one implementation of the method 1600, if the trigger 144 is activated, the last frame component of the first sequence of frame components 154 depicts the group of numbers is the winning number.

According to one implementation of the method 1600, outputting the second animation 152 includes initiating playback of a second sequence of frame components 156 at the second portion 162 of the display screen 112. A last frame component of the second sequence of frame components 156 can include a frame of the group of animations 152A that depicts an indication that the trigger 144 is activated in response to a determination to activate the trigger 144, and the last frame component of the second sequence of frame components 156 can include a frame of the group of animations 152B that depicts an indication that the trigger 144 is not activated in response to a determination not to activate the trigger 144. Outputting the second animation 152 also includes outputting the playback of the second sequence of frame components 156 at the second portion 162 of the display screen 112.

According to one implementation of the method 1600, if the trigger 144 is not activated, outputting the second animation 152B includes initiating playback of a second sequence of frame components 156 at the second portion 162 of the display screen 112. A last frame component of the second sequence of frame components 156 depicts an indication that the trigger 144 is not activated.

According one implementation, the method 1600 includes outputting at least one fixed image 490 to another portion 164 of the display screen 112 as part of the graphical user interface 140. The at least one fixed image 490 is output concurrently with the animation 150, 152. The betting board shown on the display screen 112 can be a fixed image for at least some portion of the performing the game, such as the portions of the game while the roulette wheel is spinning as represented in at least FIGS. 4 to 8.

According to one implementation of the method 1600, the first animation 150 includes a first wheel segment 410 spinning in a circular manner. The first wheel segment 410 has a plurality of numbered positions, and each number of the plurality of numbers is associated with a corresponding position of the plurality of numbered positions.

According to one implementation of the method 1600, the first animation comprises an object spinning around a first wheel segment 410. For example, the object can include a ball spinning around the first wheel segment 410. The first wheel segment 410 has a plurality of numbered positions, and each number of the plurality of numbers is associated with a corresponding position of the plurality of numbered positions.

According to one implementation of the method 1600, the second animation 152 includes a second wheel segment 420 spinning in a circular manner. The second wheel segment 420 includes a first section (e.g., the trigger activation region 430) that, when aligned with selection indicia 450, indicates that the trigger 144 is activated. The second wheel segment 420 also includes a second section (e.g., the trigger deactivation region 440) that, when aligned with the selection indicia 450, indicates that the trigger 144 is not activated.

According to one implementation, the method 1600 includes generating a sequence of frames. Each frame in the sequence of frames includes data for generating a part of the first animation 150 and a part of the second animation 152. Each part of the first animation 150 represents a respective snapshot of the first portion 160 of the display screen 112 and each part of the second animation 152 represents a respective snapshot of the second portion 162 of the display screen 112. According to the one implementation of the method 1600, outputting the animation 150, 152 to the display screen 112 as part of the graphical user interface 140 occurs by the processor 102 outputting the sequence of frames to the display screen 112.

According to one implementation, the method 1600 includes outputting, by the processor 102, a selection indicia 450 to the display screen 112 as part of the graphical user interface 140. After the animation 150, 152 stops, the selection indicia 450 highlights the group of numbers as the winning number and an indication that the trigger 144 is activated.

According to one implementation, the method 1600 includes outputting, by the processor 102, a selection indicia 450 to the display screen 112 as part of the graphical user interface 140. After the animation 150, 152 stops, the selection indicia 450 highlights the single number (e.g., the primary winning number 142) as the winning number and an indication that the trigger 144 is not activated.

According to one implementation of the method 1600, outputting the animation 150, 152 includes selecting a set of frames stored in a non-transitory computer-readable memory (e.g., one or more of the databases 108, 110 and/or the memory 104) corresponding to the single number and the indication of whether the trigger 144 is activated and outputting the set of frames according to a frame sequence defined for the set of frames. According to one implementation, the non-transitory computer-readable memory contains several sets of frames, and the several sets of frames includes multiple sets of frames corresponding to each number of the plurality of numbers in the computer-implemented game. The multiple sets of frames corresponding to each number of the plurality of numbers in the computer-implemented game include one or more sets of frames for showing a respective number as the winning number and that the trigger 144 is not activated, and one or more sets of frames for showing a respective group of numbers as the winning number and that the trigger 144 is activated.

According to one implementation of the method 1600, if the trigger 144 is activated, the amount of the award 148 is a multiple of a wager if the particular user-selectable number is the single number or one of the additional numbers.

The method 1600 of FIG. 16 increases the player's odds of selecting a winning number during an iteration of the computer-implemented game, without having to wager additional money. For example, if the trigger 144 is activated, additional winning numbers 146 are generated, which increases the player's odds of winning, and thus makes the user experience more enjoyable.

V. Additional Example Architectures

Figure 17:
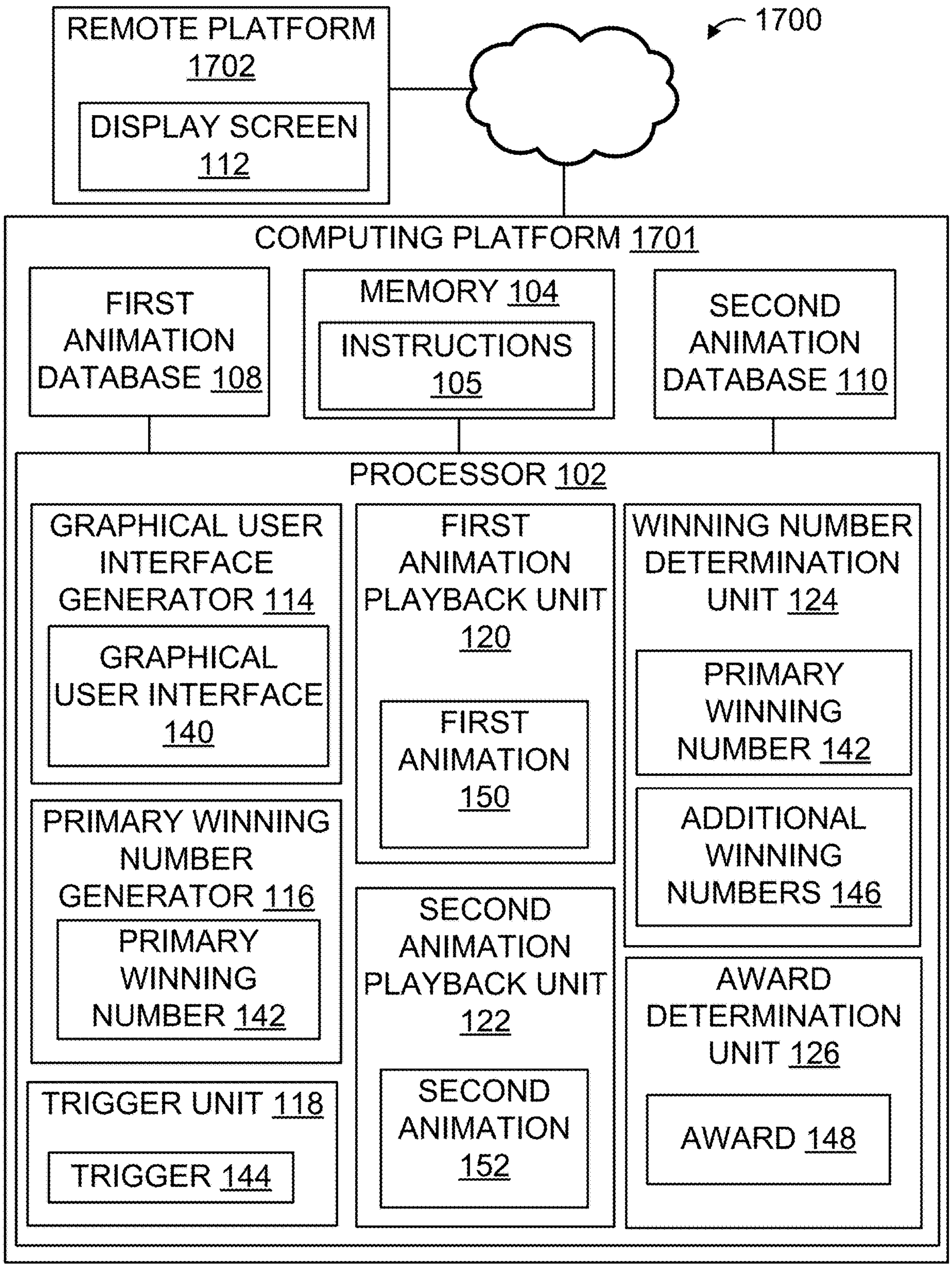
FIG. 17 is a block diagram of a computing system in accordance with the example embodiments.

FIG. 17 is a block diagram of a computing system 1700 configured for performing computer-implemented games in accordance with the example embodiments. The computing system 1700 can include a computing platform 1701 (e.g., one or more computing platforms). The computing platform 1701 can be configured to communicate with a remote platform 1702 (e.g., one or more remote platforms) according to a client/server architecture, a peer-to-peer architecture, and/or other architectures. The remote platform 1702 can be configured to communicate with other remote platform(s) via the computing platform 1701 and/or according to a client/server architecture, a peer-to-peer architecture, and/or other architectures. Users can access the computing system 1700 directly or via the remote platform 1702. According to some embodiments, one or more of the computing platform 1701, the remote platform 1702, and/or other components of computing system 1700 can be the same as or similar to one or more components of the machine 100. For example, as depicted in FIG. 17, the computing platform 1701 can include the memory 104, the processor 102, the first animation database 108, and the second animation database 110. The remote platform 1702 can include the display screen 112.

Thus, if the remote platform 1702 corresponds to a user device (e.g., a mobile phone, a tablet, a laptop, a smartphone, etc.), the player can use the remote platform 1702 to play the computer-implemented game. For example, the computing platform 1701 can be a server that communicates with the remote platform 1702 though a wireless connection.

The computing system 1700, the computing platform 1701 and/or the remote platform 1702 can perform one or more functions of the method 1600.

Figure 18:
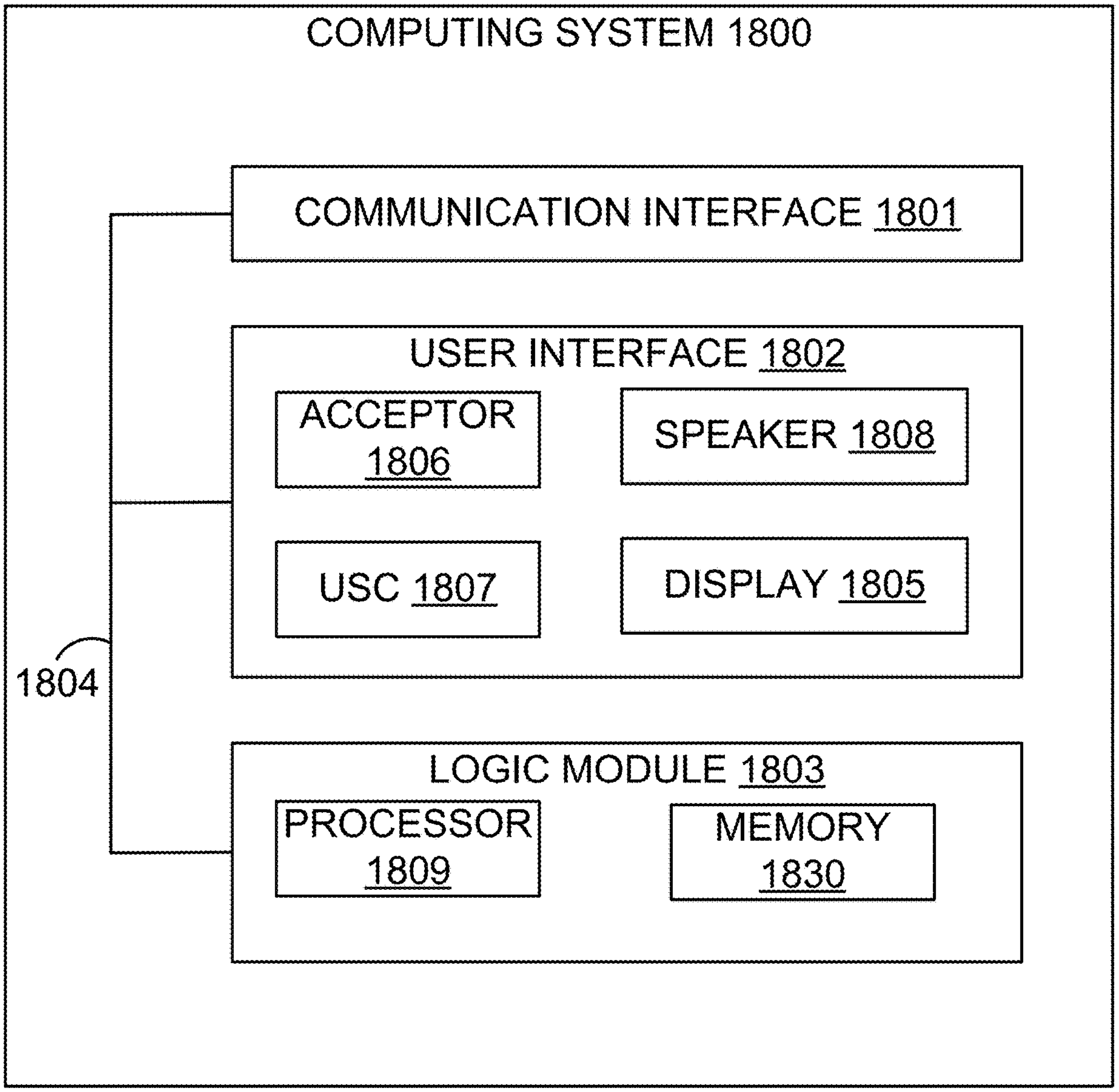
FIG. 18 is a block diagram of a computing system in accordance with the example embodiments.

FIG. 18 is a block diagram of a computing system 1800 in accordance with the example embodiments. The computing system 1800 can be arranged as and/or include a stand-alone computing system, a distributed computing system, a personal computer, a server computing system, a client computing system, a portable computing system, a mobile phone, a smartphone, a tablet device, and/or some other computing device. The computing system 1800 can be referred to as a user device.

The computing system 1800 can include a communication interface 1801, a user interface 1802, and a logic module 1803, two or more of which can be coupled together by a connection mechanism 1804 (e.g., a system bus or network). The communication interface 1801 can include a wired or wireless network communication interface. For purposes of this description, any data described as being provided, sent, or transmitted by the computing system 1800 can include data sent by the communication interface 1801 over a communication network. In addition, for purposes of this description, any data described as being received by the computing system 1800 can include data sent to communication interface 1801 over a communication network.

The user interface 1802 includes components that can facilitate interaction with a user of the computing system 1800. For example, the user interface 1802 can include user interface output components, such as a display 1805 and/or a speaker 1808. As another example, the user interface can include user interface input components, such as an acceptor 1806, a user-selectable control 1807 (e.g., a keypad, a keyboard, or a mouse), or a touch-sensitive screen. The touch-sensitive screen can be part of the display 1805, such that the display 1805 is operable as both a user interface input component and a user interface output component. The user-selectable control 1807 can include one or more user-selectable controls, one or more of which can be implemented on the touch sensitive screen (which can also be referred to as a touch pad). The logic module 1803 (e.g., the processor 1809) can be configured to detect selection of a user-selectable control and cause the computing system to perform one or more functions in response to the detected selection. As an example, a user-selectable control of the user interface 1802 can be configured one of the selectable option 208, 210, 212, 214, 216, 218, 220, 222, 224, 228, 234, 236, 238, the chip selector 226, the double 230 option, the autoplay 232 option, the spin 250 option, or the return 322 option.

The speaker 1808 can output sound waves, such as sound waves corresponding to a performance of a computer-implemented game. As an example, the sound waves can represent sound waves produced by a roulette wheel spinning in a casino. As another example, the sound waves can include sounds waves produced by a person speaking or a musical instrument. As another example, the sound waves can include audible sounds corresponding to an animation showing portion(s) of a computer-implemented game performance.

The display 1805 is configured to display (i.e., visually present and/or show) content. As an example, the content can correspond to a performance of a computer-implemented game, such as a spinnable wheel, a wager amount, a previous result, an award, an instruction, and/or a user-selectable control (e.g., a button). As another example, the content can include text, a graphic, a graphical user interface, an animation, a video, or some other content as well or instead. As yet another example, the content can include content shown in and/or described with respect to any of FIGS. 4-15. The display 1805 can include a display screen (e.g., a display panel or a graphical display unit) including a quantity of pixels (e.g., 786,432 pixels in an array of pixels that is 1,024 pixels by 768 pixels). Other examples of an array of pixels are possible.

Additionally, the display 1805 and/or the display screen can include and/or be arranged as a liquid crystal display (LCD), a light emitting diode (LED) display, an organic LED (OLED) display, a plasma display or some other type of display. Furthermore, the display 1805 can embody the touch sensitive screen noted above such that the display 1805 and/or display screen includes and/or is arranged as a touch screen display.

The logic module 1803 can include and/or be arranged as a processor 1809 and/or a memory 1830. The processor 1809 can include one or more processors. The processor 1809 can include a general-purpose processor (e.g., a microprocessor) or a special-purpose processor (e.g., a graphics process, a digital signal processor or an application specific integrated circuit) and can be integrated in whole or in part with the communication interface 1801 or the user interface 1802. Any memory discussed in this description or shown in the drawings can be referred to as a computer-readable memory, data storage, computer-readable data storage, among other names.

The memory 1830 can include volatile or non-volatile storage components and can be integrated in whole or in part with the processor 1809. The memory 1830 can take the form of a non-transitory computer-readable medium and can include software program instructions, that when executed by the processor 1809, cause the computing system 1800 to perform one or more of the functions described herein. Any software program instructions discussed in this description or shown in the drawings can be referred to as computer-readable program instructions, or more simply, program instructions, or a software application. A set of program instructions (e.g., a portion of a software application) can be referred to as a module or a logic module.

As an example, the program instructions can be executable by the processor 1809 to perform a method, such as a method 1600 including one or more of the functions shown in FIG. 16.

As another example, the program instructions can be executable by the processor 1809 to determine a payment has been received by the user interface 1802 (e.g., by the acceptor 1806) and thereafter allow a performance of a computer-implemented game to be output in response to an input entered via the user interface 1802.

The memory 1830 can also include operating system software on which the computing system 1800 can operate. For example, the computing system 20 can operate on a Windows®-based operating system available from the Microsoft® Corporation of Redmond, Wash. Other examples of an operating system are possible.

The memory 1830 can include a database. As an example, the memory 1830 can include a credit account database containing data related to performing an outcome event by a computing system, as well as adjusting account balances (e.g., quantities of credits) associated with client computing systems. The processor 1809 can write data into the database and read data within the database.

Figure 19:
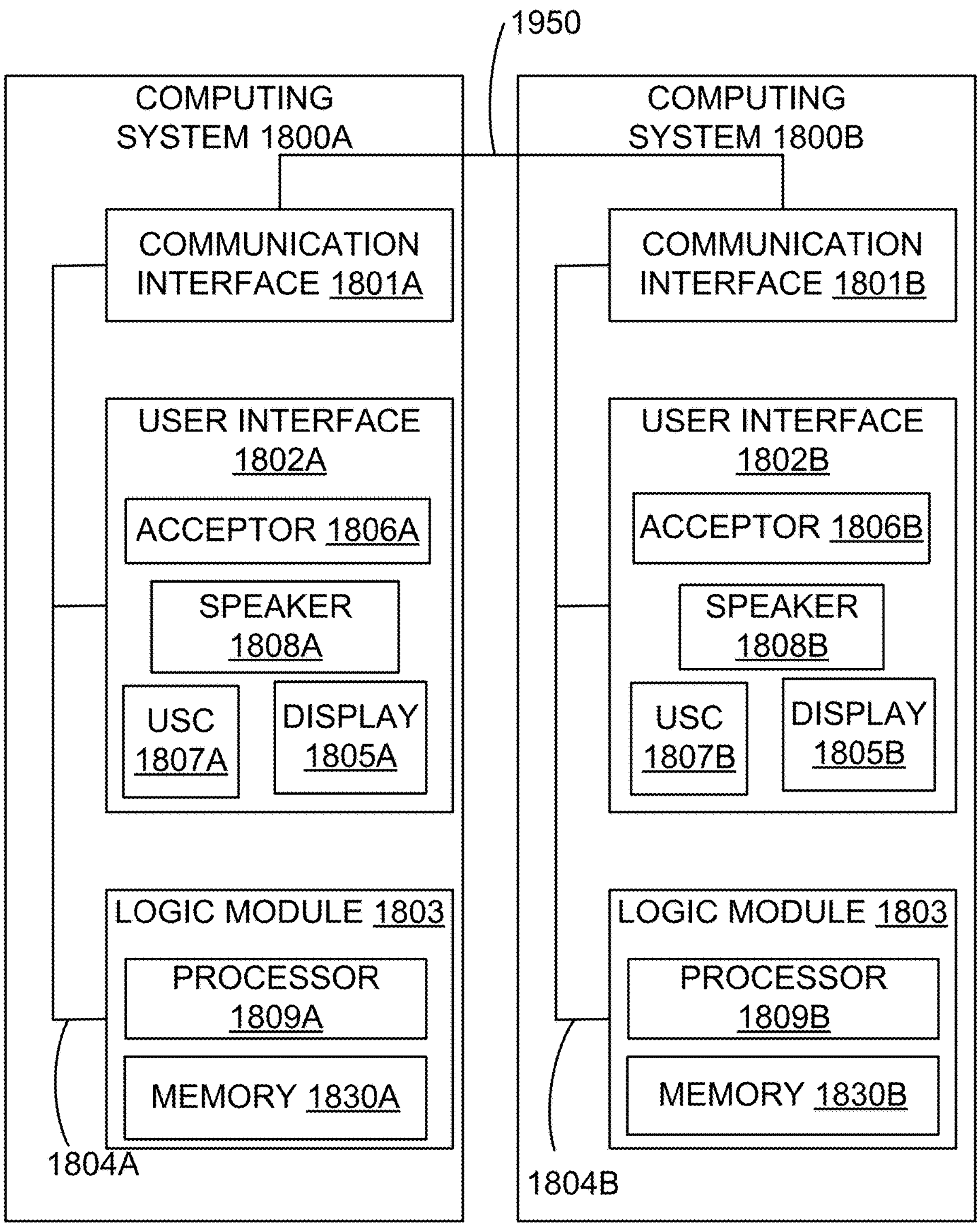
FIG. 19 is a block diagram of two computing systems connected to one another via a computer network in accordance with the example embodiments.

FIG. 19 is a block diagram of a computing system 1800A connected to a computing system 1800B over a communication network 1950. A configuration of elements including the computing system 1800A and the computing system 1800B can be referred to as a server-client based configuration.

The components of the computing system 1800A and the computing system 1800B are shown with corresponding "A" and "B" reference numerals (i.e., based on the computing system 1800). For example, the computing system 1800A includes a communication interface 1801A, a user interface 1802A (which includes a display 1805A, an acceptor 1806A, a user-selectable control 1807A, and/or a speaker 1808A), a logic module 1803A (which includes a processor 1809A and/or a memory 1830A), and a connection mechanism 1804A. Likewise, the computing system 1800B includes a communication interface 1801B, a user interface 1802B (which includes a display 1805B, an acceptor 1806B, a user-selectable control 1807B, and/or a speaker 1808B), a logic module 1803B (which includes a processor 1809B and/or a memory 1830B), and a connection mechanism 1804B. In at least some embodiments, the acceptor 1806A includes a validator, and the acceptor 1806B includes a paper money acceptor, a coin acceptor, a validator, and/or a card reader.

The computing system 1800A is configured to communicate with the computing system 1800B over the communication network 1950 (via the communication interface 1801A and the communication interface 1801B). Likewise, the computing system 1800B is configured to communicate with the computing system 1800A over the communication network 1950. For purposes of this description, any data described as being sent or transmitted by the computing system 1800A can include data sent by the communication interface 1801A over the communication network 1950. Similarly, any data described as being sent or transmitted by the computing system 1800B can include data sent by the communication interface 1801B over the communication network 1950. Furthermore, for purposes of this description, any data described as being received by the computing system 1800A can include data the computing system 1800A receives from the communication network 1950 using communication interface 1801A. Similarly, any data described as being received by the computing system 1800B can include data the computing system 1800B receives from the communication network 1950 using the communication interface 1801B.

In at least some embodiments, the communication network 1950 includes a local area network (LAN), such as a LAN located at least partially within a casino. In accordance with those embodiments, multiple instances of the computing system 1800B dispersed throughout the casino can communicate with the computing system 1800A. In some cases, the computing system 1800A can be located within the casino. In some other cases, the computing system 1800A can be located away from the casino.

In another example, the communication network 1950 can include a wide-area network (WAN), such as an Internet network or a network of the World Wide Web. In such a configuration, the computing system 1800B can communicate with the computing system 1800A via a website portal (for a virtual casino) hosted on the computing system 1800A. The data described herein as being transmitted by the computing system 1800A to the computing system 1800B or by the computing system 1800B to the computing system 1800A can be transmitted as datagrams according to the user datagram protocol (UDP), the transmission control protocol (TCP), or another protocol, and/or a file (e.g., a hypertext transfer protocol file) or some other type of file or communication.

The communication network 1950 can include any of a variety of network topologies and network devices. The communication network 1950 can include a wireless and/or wired network topology and network devices operable on one or both of those network topologies. As an example, the communication network 1950 can include a public switched telephone network, a cable network, a cellular wireless network, a wide area network (WAN), a local area network, an IEEE® 802.11 standard for wireless local area networks (wireless LAN) (which is sometimes referred to as a WI-FI® standard) (e.g., 802.11a, 802.11b, 802.11g, 802.11n, or 802.11p), and/or a network operating according to a BLUETOOTH® standard (e.g., the BLUETOOTH® standard 5.3) developed by the Bluetooth Special Interest Group (SIG) of Kirkland, Washington.

As noted, the computing system 1800 can include the acceptor 1806. In at least some embodiments, the acceptor 1806 includes an acceptor of a physical item associated with a monetary value, such as a paper money acceptor, a coin acceptor, or a card reader. The acceptor 1806 can include a validator configured to identify the physical item, and determine whether the physical item is suitable as payment to the computing system 1800. A coin acceptor can be configured to accept and identify a coin distributed by a geo-political body or a token generated for an organization other than a geo-political body, such as a casino. A card reader can be configured to read a bank card (e.g., a credit or debit card) or a customer card (e.g., a casino loyalty card).

In at least some embodiments, the computing system 1800 can also physically dispense a corresponding award or payout (e.g., cash), or otherwise facilitate the payout (by adding funds to an electronic account associated with a customer card). Such an activity can be triggered by a cash out button either on the display 1805 or elsewhere on the computing system 1800. In at least some embodiments, the user interface 1802 includes a payout device to dispense the payout (e.g., a cash payout). As an example, the user interface 1802 includes one or more of a coin hopper, a coin counter, a coin dispenser, a coin tray, a bill (i.e., currency) chamber, a bill counter, and/or or a bill dispenser to dispense the payout. Additionally or alternatively to determining the payout amount, the computing system 1800 can perform other actions to award the user. For instance, the computing system 1800 can display an indication of a tangible prize. Other types of awards can be used as well.

For purposes of this description, a function that can be performed by the computing system 1800, the computing system 1800A, or the computing system 1800B can be performed, at least in part, by a processor of that computing system executing program instructions and/or a software application. Those program instructions and/or software application can be stored within the memory 1830, 1830A, or 1830B, respectively.

A memory can include one or more memories. For example, a memory can include the memory 1830. As another example, a memory can include the memory 1830A and the memory 1830B. In accordance with this latter example, a memory can be arranged as a distributed memory. One or more processors can be operatively coupled to a memory. For example, the processor 1809 is operatively coupled to the memory 1830. As another example, the processor 1809A is operatively coupled to the memory 1830A, and the processor 1809B is operatively coupled to the memory 1830B. In accordance with this latter example, a processor can be arranged as a distributed processor.

Figure 20:
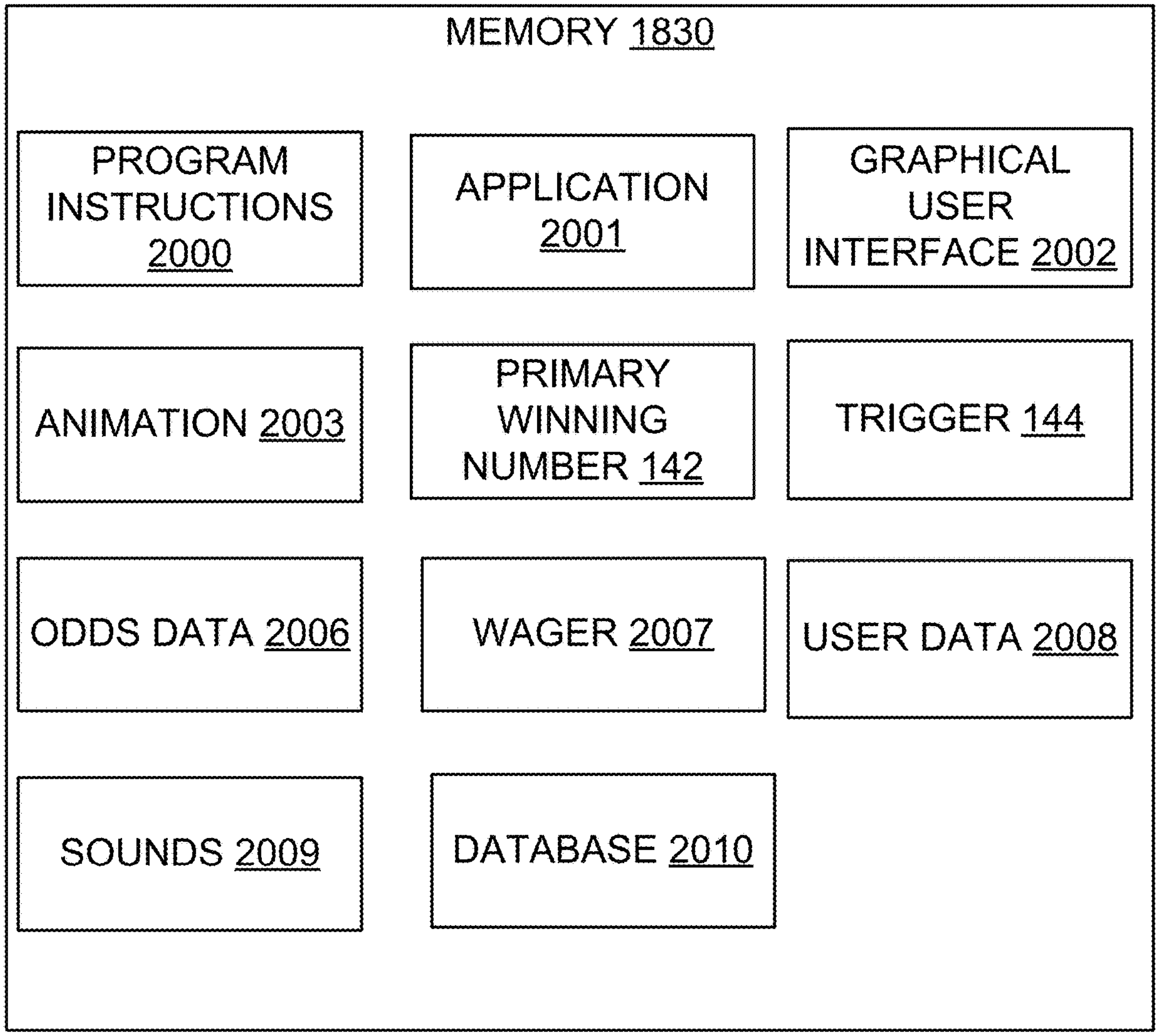
FIG. 20 shows data that can be stored in a memory in accordance with the example embodiments.

FIG. 20 shows data that can be stored in the memory 1830 in accordance with the example embodiments. The memory 1830A and/or the memory 1830B can include some or all of the content shown in FIG. 20. The memory 104 shown in FIG. 1 can include some or all of the content shown in and/or discussed with respect to FIG. 20. The description of the memory 1830 refers to the processor 1809. A person having ordinary skill in the art will understand that a different processor (e.g., the processor 1809A, 1809B, 102) can read and/or write to a memory (e.g., the memory 1830A, 1830*b*, 104) including content shown and/or described with respect to FIG. 20. In at least some embodiments, at least a portion of the content shown in FIG. 20 is embodied as a data register within a processor.

As shown in FIG. 20, the memory 1830 includes program instructions 2000, an application 2001, a graphical user interface 2002, an animation 2003, the primary winning number 142, the trigger 144, odds data 2006, a wager 2007, user data 2008, sounds 2009, and/or a database 2010.

The program instructions 2000 can include computer-readable program instructions (e.g., machine-readable instructions) executable by one or more processors. The program instructions 2000 can be executable to cause a computing system or a component of the computing system to perform any function(s) described in this description.

The application 2001 can include one or more applications. The program instructions 2000 or a portion of the program instructions 2000 can be embodied in the application 2001. The application 2001 can include any software application discussed in this description. Additionally or alternatively, the application 2001 can include an operating system, such as any operating system described in this description, or a browser application to request a web service from a server that serves an example game to a client computing system.

The graphical user interface 2002 includes one or more graphical user interfaces. As an example, the graphical user interface 2002 can include a graphical user interface 140 shown in any of FIGS. 1-15. As another example, the graphical user interface 2002 can include a graphical user interface that can be output on a display (e.g., the display 1805, 1805A, 1805B) or the display screen 112. As yet another example, the graphical user interface 2002 can include a template that specifies a particular animation of the animation 2003 to be shown while the graphical user interface is output on the display. The graphical user interface 2002 can include a GUI embodied with a user-selectable control, such as a user-selectable control corresponding to a selectable option disclosed on one or more of the drawings.

The animation 2003 can include one or more animations. The animation 2003 can include computer-readable files containing animations for outputting on a display, such as the display 1805, 1805A, 1805B, the display screen 112, and/or with a graphical user interface 140. As an example, the animation 2003 can include animation files, such as an animation file with one of the following file name extensions: GIF, PNG, MPEG, JPEG, SVG, or some other file name extension. Each animation in the animation 2003 can correspond to an index value such that the processor 1809A can provide the processor 1809B with an instruction including a particular index value so that the processor 1809B outputs via the display 1805B an animation file corresponding to the particular index value. Accordingly, the processor 1809A does not have to transmit the animation file to the processor 1809B each time the animation file is to be output via the display 1805B. In some implementations, the animation 2003 can include the animations 150, 152.

As an example, the animation 2003 can include an animation that shows a roulette ball landing on a spinning roulette wheel and the roulette ball moving on the roulette wheel in a direction opposite of the spinning roulette wheel, the roulette ball dropping into a roulette wheel pocket, and the roulette wheel stopping. An animation can show the roulette wheel spinning clockwise or counter-clockwise.

As another example, the animation 2003 can include an animation that shows a casino chip or chips being placed on the roulette table to designate the number(s) being selected for a wager. The animation can represent multiple casino chips as a stack of casino chips. The animation of casino chip placement can be based on movement of a computer mouse of the user interface 1802, 1802A, 1802B.

As yet another example, the animation 2003 can include an animation that shows a prize wheel spinning and then stopping with a particular multiplier value disposed adjacent to a pointer. As still yet another example, the animation 2003 can include an animation that shows a coin flip representing a determination of whether to activate a trigger mode of an example game.

VI. Frame Components Example

Figure 21:
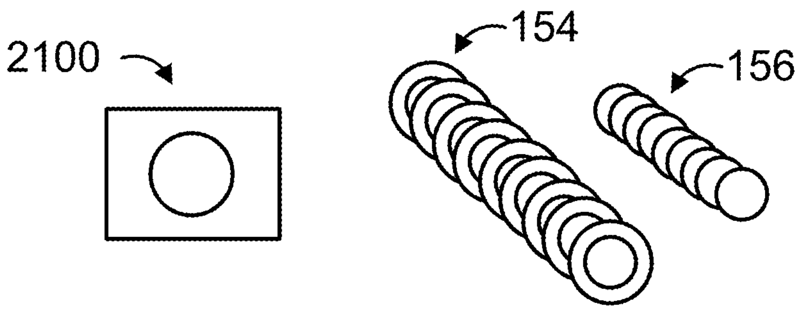
FIG. 21 shows an example of using frame components to depict the animation and using a fixed image for the remaining portion of a graphical user interface during the animation in accordance with the example embodiments.

FIG. 21 illustrates an example of using frame components 154, 156 to depict the animations 150, 152 and using a fixed image 2100 for the remaining portion of the graphical user interface during the animation 150, 152. The fixed image 2100 can include the fixed image 490.

It should be appreciated that processing by generating animations 150, 152 that using frame components 154, 156, as opposed to full frames, processing complexity can be reduced. For example, generating full frames to depict the animations 150, 152 may result in increased processing efficiency because a greater number of pixels have to be processed. However, by inserting the fixed image 2100 at the portion 164 of the display screen 112 where there are no pixel changes and using frame components 154, 156 (e.g., a reduced number of pixels compared to the number of pixels associated with a full frame) at the portions 160, 162 of the display screen 112 where the pixel changes represent the wheels segments 410, 420 spinning, a smaller number of pixels are processed during the animation 150, 152, resulting in reduced processing complexity and greater processing efficiency.

VII. Conclusions

While one or more disclosed functions have been described as being performed by a machine (e.g., the machine 100) or a computing system (e.g., the computing systems 1700, 1800, 1800A, 1800B), one or more of the functions can be performed by any entity, including but not limited to those described herein. As such, while this disclosure includes examples in which the computing system 1800A performs select functions and sends data to the computing system 1800B, such that the computing system 1800B can perform complementing functions and receive the data, variations to those functions can be made while adhering to the general server-client dichotomy and the scope of the disclosed machines, computing systems, and methods.

For example, rather than the computing system 1800A sending select data to the computing system 1800B, such that the computing system 1800B can generate and display appropriate images, the computing system 1800A can generate the images, animations, or graphical user interfaces and send them to the computing system 1800B for display. Indeed, it will be appreciated by one of ordinary skill in the art that the "break point" between the server computing system's functions and the client computing system's functions can be varied.

Furthermore, the functions described throughout this can be performed in an order different than an order of functions (if any) described herein or shown in the drawings. Additionally, embodiments in the form of a method can include one or more of the functions described herein or shown in the drawings. Even more, for this description, the use of ordinal numbers such as "first," "second," "third" and so on can be used to distinguish respective elements. The use of ordinal numbers can also denote an order of elements, a first element in a sequence of a method need not be an initial element in a method sequence, but rather it may be a first element discussed in a portion of the description.

Furthermore still, while examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above may relate to one or more of the following enumerated example embodiments (EEE).

EEE 1 is a method comprising: outputting, by a processor, a graphical user interface to a display screen, the graphical user interface comprising a plurality of user-selectable numbers corresponding to a plurality of numbers in a computer-implemented game; after receiving an indication that a particular user-selectable number on the graphical user interface has been selected: randomly selecting, by the processor, a single number from the plurality of numbers for the computer-implemented game; and randomly determining, by the processor, whether to activate a trigger for the computer-implemented game; and outputting, by the processor, an animation to the display screen as part of the graphical user interface, wherein, after the animation stops, the display screen depicts: an indication of the single number; an indication of whether the trigger is activated; and an amount of an award based on whether the particular user-selectable number is a winning number, wherein the winning number is any number in a group of numbers if the trigger is activated or is the single number if the trigger is not activated, wherein the group of numbers includes the single number and one or more additional numbers from the plurality of numbers.

EEE 2 is the method of EEE 1, wherein outputting the animation comprises: outputting a first animation to a first portion of the display screen, the first animation associated with the indication of the single number; and outputting a second animation to a second portion of the display screen, the second animation associated with the indication of whether the trigger is activated.

EEE 3 is the method of any one of EEE 1 or 2, wherein outputting the first animation comprises: initiating playback of a first sequence of frame components, wherein a last frame component of the first sequence of frame components depicts at least the single number; and outputting the playback of the first sequence of frame components at the first portion of the display screen.

EEE 4 is the method of any one of EEE 1 to 3, wherein, if the trigger is activated, the last frame component of the first sequence of frame components depicts the group of numbers is the winning number.

EEE 5 is the method of any one of EEE 1 to 4, wherein outputting the second animation comprises: initiating playback of a second sequence of frame components at the second portion of the display screen, wherein a last frame component of the second sequence of frame components depicts an indication that the trigger is activated in response to a determination to activate the trigger, and wherein the last frame component of the second sequence of frame components depicts an indication that the trigger is not activated in response to a determination not to activate the trigger; and outputting the playback of the second sequence of frame components at the second portion of the display screen.

EEE 6 is the method of any one EEE 1 to 3 and 5, wherein, if the trigger is not activated, outputting the second animation comprises: initiating playback of a second sequence of frame components at the second portion of the display screen, wherein a last frame component of the second sequence of frame components depicts an indication that the trigger is not activated.

EEE 7 is the method of any one of EEE 1 to 6, further comprising outputting at least one fixed image to another portion of the display screen as part of the graphical user interface, wherein the at least one fixed image is output concurrently with the animation.

EEE 8 is the method of any one of EEE 1 to 7, wherein the first animation comprises a first wheel segment spinning in a circular manner, wherein the first wheel segment has a plurality of numbered positions, and wherein each number of the plurality of numbers is associated with a corresponding position of the plurality of numbered positions.

EEE 9 is the method of any one of EEE 1 to 7, wherein the first animation comprises an object spinning around a first wheel segment, wherein the first wheel segment has a plurality of numbered positions, and wherein each number of the plurality of numbers is associated with a corresponding position of the plurality of numbered positions.

EEE 10 is the method of any one of EEE 1 to 9, wherein the second animation comprises a second wheel segment spinning in a circular manner, wherein the second wheel segment comprises a first section that, when aligned with selection indicia, indicates that the trigger is activated, and wherein the second wheel segment comprises a second section that, when aligned with the selection indicia, indicates that the trigger is not activated.

EEE 11 is the method of any one of EEE 1 to 10, further comprising generating a sequence of frames, wherein each frame in the sequence of frames includes data for generating a part of the first animation and a part of the second animation, wherein each part of the first animation represents a respective snapshot of the first portion of the display screen and each part of the second animation represents a respective snapshot of the second portion of the display screen.

EEE 12 is the method of any one of EEE 1 to 11, wherein outputting the animation to the display screen as part of the graphical user interface occurs by the processor outputting the sequence of frames to the display screen.

EEE 13 is the method of any one of EEE 1 to 12, further comprising outputting, by the processor, a selection indicia to the display screen as part of the graphical user interface, wherein, after the animation stops, the selection indicia highlights the group of numbers as the winning number and an indication that the trigger is activated.

EEE 14 is the method of any one of EEE 1 to 13, further comprising outputting, by the processor, a selection indicia to the display screen as part of the graphical user interface, wherein, after the animation stops, the selection indicia highlights the single number as the winning number and an indication that the trigger is not activated.

EEE 15 is the method of any one of EEE 1 to 14, wherein outputting the animation includes selecting a set of frames stored in a non-transitory computer-readable memory corresponding to the single number and the indication of whether the trigger is activated and outputting the set of frames according to a frame sequence defined for the set of frames.

EEE 16 is the method of any one of EEE 1 to 15, wherein the non-transitory computer-readable memory contains several sets of frames, wherein the several sets of frames includes multiple sets of frames corresponding to each number of the plurality of numbers in the computer-implemented game, and wherein the multiple sets of frames corresponding to each number of the plurality of numbers in the computer-implemented game include one or more sets of frames for showing a respective number as the winning number and that the trigger is not activated, and one or more sets of frames for showing a respective group of numbers as the winning number and that the trigger is activated.

EEE 17 is the method of EEE 1, wherein the animation includes a single animation showing a first wheel segment and a second wheel segment spinning and then stopping.

EEE 18 is the method of any one of EEE 1 to 17, wherein, if the trigger is activated, the amount of the award is a multiple of a wager if the particular user-selectable number is the single number or one of the additional numbers.

EEE 19 is the method of any one of EEE 1 to 17, wherein, if the trigger is not activated and the particular user-selectable number is the single number, the amount of the award equals a wager on the single number times a standard payout rate corresponding to the single number.

EEE 20 is the method of any one of EEE 1 to 17, wherein, if the trigger is not activated and the particular user-selectable number is the single number, the amount of the award equals a wager on the single number times a standard payout rate corresponding to the single number times a multiplier corresponding to the single number.

EEE 21 is the method of any one of EEE 1 to 17, wherein, if the trigger is not activated and the particular user-selectable number is the single number, the amount of the award equals a wager on the single number times a sum of a standard payout rate corresponding to the single number and a multiplier corresponding to the single number.

EEE 22 is the method of any one of EEE 19 to 21, wherein the standard payout rate is lower than a standard roulette game payout rate.

EEE 23 is the method of any one of EEE 1 to 17, wherein, if the trigger is activated and a wager is made on one of the additional numbers, the amount of the award is based at least in part on the wager times a payout rate corresponding to the one of the additional numbers.

EEE 24 is the method of any one of EEE 1 to 17, wherein, if the trigger is activated and a wager is made on one of the additional numbers, the amount of the award is based at least in part on the wager times a payout rate corresponding to the one of the additional numbers times a multiplier corresponding to the one of the additional numbers.

EEE 25 is the method of any one of EEE 1 to 17, wherein, if the trigger is activated and a wager is made on one of the additional numbers, the amount of the award is based at least in part on the wager times a sum of a payout rate corresponding to the one of the additional numbers plus a multiplier corresponding to the one of the additional numbers.

EEE 26 is the method of any one of EEE 22 to 23, wherein payout rate corresponding to the one of the additional numbers is different than a payout rate corresponding to the single number.

EEE 27 is the method of EEE 26, wherein the payout rate corresponding to the single number is greater than the payout rate corresponding to the one of the additional numbers and payout rates corresponding to the other additional numbers.

EEE 28 is a computing system comprising: a processor, and a non-transitory computer-readable memory storing executable instructions, wherein execution of the executable instructions by the processor causes a computing system to perform the method of any one of EEE 1 to 27.

EEE 29 is a non-transitory computer-readable memory having stored therein instructions executable by a processor to cause a computing system to perform the method of any one of EEE 1 to 27.

The invention claimed is:

1. A method comprising:

outputting, by a processor, a graphical user interface to a display screen, the graphical user interface comprising a plurality of user-selectable numbers corresponding to a plurality of numbers in a computer-implemented game;

after receiving an indication that a particular user-selectable number on the graphical user interface has been selected:

randomly selecting, by the processor, a single number from the plurality of numbers for the computer-implemented game; and randomly determining, by the processor, whether to activate a trigger for the computer-implemented game; and outputting, by the processor, data to the display screen to change the graphical user interface, wherein outputting the data includes outputting frame components corresponding to a portion of the display screen that changes for successive frames to show animation and outputting a fixed image corresponding to a portion of the display screen that does not change for the successive frames, wherein outputting the frame components comprises:

outputting first frame components for a first animation to a first portion of the display screen, the first animation associated with an indication of the single number; and outputting second frame components for a second animation to a second portion of the display screen, the second animation associated with an indication of whether the trigger is activated, wherein the second animation comprises a wheel segment spinning in a circular manner, and wherein the wheel segment comprises:

a first section that, when aligned with selection indicia, indicates that the trigger is activated, and a second section that, when aligned with the selection indicia, indicates that the trigger is not activated, wherein, after the animation stops, the display screen depicts:

the indication of the single number;

the indication of whether the trigger is activated; and an amount of an award based on whether the particular user-selectable number is a winning number, wherein the winning number is any number in a group of numbers if the trigger is activated or is the single number if the trigger is not activated, wherein the group of numbers includes the single number and one or more additional numbers from the plurality of numbers.

2. The method of claim 1, wherein outputting the first frame components comprises:

initiating playback of a first sequence of frame components, wherein a last frame component of the first sequence of frame components depicts at least the single number; and outputting the playback of the first sequence of frame components at the first portion of the display screen.

3. The method of claim 2, wherein, if the trigger is activated, the last frame component of the first sequence of frame components depicts the group of numbers is the winning number.

4. The method of claim 1, wherein outputting the second frame components comprises:

initiating playback of a second sequence of frame components at the second portion of the display screen, wherein a last frame component of the second sequence of frame components depicts an indication that the trigger is activated in response to a determination to activate the trigger, and wherein the last frame component of the second sequence of frame components depicts an indication that the trigger is not activated in response to a determination not to activate the trigger; and outputting the playback of the second sequence of frame components at the second portion of the display screen.

5. The method of claim 1, wherein, if the trigger is not activated, outputting the second frame components comprises:

initiating playback of a second sequence of frame components at the second portion of the display screen, wherein a last frame component of the second sequence of frame components depicts an indication that the trigger is not activated.

6. The method of claim 1, further comprising outputting at least one fixed image to another portion of the display screen as part of the graphical user interface, wherein the at least one fixed image is output concurrently with the animation.

7. The method of claim 1, wherein the first animation comprises another wheel segment spinning in a circular manner, wherein the other wheel segment has a plurality of numbered positions, and wherein each number of the plurality of numbers is associated with a corresponding position of the plurality of numbered positions.

8. The method of claim 1, wherein the first animation comprises an object spinning around another wheel segment, wherein the other wheel segment has a plurality of numbered positions, and wherein each number of the plurality of numbers is associated with a corresponding position of the plurality of numbered positions.

9. The method of claim 1, further comprising generating a sequence of frames, wherein each frame in the sequence of frames includes data for generating a part of the first animation and a part of the second animation, wherein each part of the first animation represents a respective snapshot of the first portion of the display screen and each part of the second animation represents a respective snapshot of the second portion of the display screen.

10. The method of claim 9, wherein outputting the data to the display screen to change the graphical user interface occurs by the processor outputting the sequence of frames to the display screen.

11. The method of claim 1, further comprising outputting, by the processor, a selection indicia to the display screen as part of the graphical user interface, wherein, after the animation stops, the selection indicia highlights the group of numbers as the winning number and an indication that the trigger is activated.

12. The method of claim 1, further comprising outputting, by the processor, a selection indicia to the display screen as part of the graphical user interface, wherein, after the animation stops, the selection indicia highlights the single number as the winning number and an indication that the trigger is not activated.

13. The method of claim 1, wherein outputting the frame components includes selecting a set of frames stored in a non-transitory computer-readable memory corresponding to the single number and the indication of whether the trigger is activated and outputting the set of frames according to a frame sequence defined for the set of frames.

14. The method of claim 13, wherein the non-transitory computer-readable memory contains several sets of frames, wherein the several sets of frames includes multiple sets of frames corresponding to each number of the plurality of numbers in the computer-implemented game, and wherein the multiple sets of frames corresponding to each number of the plurality of numbers in the computer-implemented game include one or more sets of frames for showing a respective number as the winning number and that the trigger is not activated, and one or more sets of frames for showing a respective group of numbers as the winning number and that the trigger is activated.

15. The method of claim 1, wherein, if the trigger is activated, the amount of the award is a multiple of a wager if the particular user-selectable number is the single number or one of the additional numbers.

16. A computing system comprising:

a processor; and a non-transitory computer-readable memory comprising executable instructions, where execution of the executable instructions by the processor cause the processor to perform operations comprising:

outputting a graphical user interface to a display screen, the graphical user interface comprising a plurality of user-selectable numbers corresponding to a plurality of numbers in a computer-implemented game;

after receiving an indication that a particular user-selectable number on the graphical user interface has been selected:

randomly selecting a single number from the plurality of numbers for the computer-implemented game; and randomly determining whether to activate a trigger for the computer-implemented game; and outputting data to the display screen to change the graphical user interface, wherein outputting the data includes outputting frame components corresponding to a portion of the display screen that changes for successive frames to show animation and outputting a fixed image corresponding to a portion of the display screen that does not change for successive frames, wherein outputting the frame components comprises:

outputting first frame components for a first animation to a first portion of the display screen, the first animation associated with an indication of the single number; and outputting second frame components for a second animation to a second portion of the display screen, the second animation associated with an indication of whether the trigger is activated, wherein the second animation comprises a wheel segment spinning in a circular manner, and wherein the wheel segment comprises:

a first section that, when aligned with selection indicia, indicates that the trigger is activated, and a second section that, when aligned with the selection indicia, indicates that the trigger is not activated, wherein, after the animation stops, the display screen depicts:

the indication of the single number;

the indication of whether the trigger is activated; and an amount of an award based on whether the particular user-selectable number is a winning number, wherein the winning number is any number in a group of numbers if the trigger is activated or is the single number if the trigger is not activated, wherein the group of numbers includes the single number and one or more additional numbers from the plurality of numbers.

17. A non-transitory computer-readable medium comprising instructions that, when executed by a processor, cause the processor to perform functions comprising:

outputting a graphical user interface to a display screen, the graphical user interface comprising a plurality of user-selectable numbers corresponding to a plurality of numbers in a computer-implemented game;

after receiving an indication that a particular user-selectable number on the graphical user interface has been selected:

randomly selecting a single number from the plurality of numbers for the computer-implemented game; and randomly determining whether to activate a trigger for the computer-implemented game; and outputting data to the display screen to change the graphical user interface, wherein outputting the data includes outputting frame components corresponding to a portion of the display screen that changes for successive frames to show animation and outputting a fixed image corresponding to a portion of the display screen that does not change for the successive frames, wherein outputting the frame components comprises:

outputting first frame components for a first animation to a first portion of the display screen, the first animation associated with an indication of the single number; and outputting second frame components for a second animation to a second portion of the display screen, the second animation associated with an indication of whether the trigger is activated, wherein the second animation comprises a wheel segment spinning in a circular manner, and wherein the wheel segment comprises:

a first section that, when aligned with selection indicia, indicates that the trigger is activated, and a second section that, when aligned with the selection indicia, indicates that the trigger is not activated, wherein, after the animation stops, the display screen depicts:

the indication of the single number;

the indication of whether the trigger is activated; and an amount of an award based on whether the particular user-selectable number is a winning number, wherein the winning number is any number in a group of numbers if the trigger is activated or is the single number if the trigger is not activated, wherein the group of numbers includes the single number and one or more additional numbers from the plurality of numbers.

18. The method of claim 1, wherein:

the first animation simulates a spinning of a roulette wheel, a roulette ball dropping into a roulette wheel pocket of the roulette wheel, and the roulette wheel stopping, and each number of the plurality of numbers corresponds to a respective roulette wheel pocket on the roulette wheel and to a respective position on a virtual roulette board from which the particular user-selectable number has been selected.

19. The method of claim 18, wherein the one more additional numbers are adjacent to the single number represented on the roulette wheel or adjacent to one or more of the one or more additional numbers represented on the roulette wheel.

20. The method of claim 1, wherein a random calculation is performed to determine how many numbers are contained in the one or more additional numbers.

* * * * *